United States Patent
Edmon et al.

(10) Patent No.: US 6,813,277 B2
(45) Date of Patent: Nov. 2, 2004

(54) METHOD AND APPARATUS ENABLING MULTIPLE ACCESS ON A BROADBAND COMMUNICATION NETWORK

(75) Inventors: Eugene L. Edmon, Danville, CA (US); Chia-Chang Li, Holmdel, NJ (US); Kotikalapudi Sriram, Marlboro, NJ (US)

(73) Assignee: Lucent Technologies Inc., Murray Hilll, IL (US)

( * ) Notice: Subject to any disclaimer, the term of this patent is extended or adjusted under 35 U.S.C. 154(b) by 345 days.

(21) Appl. No.: 10/036,272

(22) Filed: Dec. 26, 2001

(65) Prior Publication Data

US 2002/0057709 A1 May 16, 2002

Related U.S. Application Data

(63) Continuation of application No. 09/060,684, filed on Apr. 15, 1998, now abandoned, which is a continuation of application No. 08/269,264, filed on Jun. 30, 1994, now abandoned.

(51) Int. Cl.⁷ ................................................. H04J 3/00
(52) U.S. Cl. ...................................... 370/442; 370/468
(58) Field of Search ................................ 370/442, 347, 370/321, 337, 351, 352, 401, 465, 470, 461, 462, 457, 458, 459, 460, 468, 345.1, 251, 252, 254, 395.61, 395.63, 395.65, 395.64, 395.42, 395.43, 395.5, 395.41, 395.21, 396

(56) References Cited

U.S. PATENT DOCUMENTS 5,214,645 A * 5/1993 Hagirahim .................. 370/440
5,570,355 A * 10/1996 Dail et al. ................... 370/352
5,883,901 A * 3/1999 Chiu et al. ................... 370/508

* cited by examiner

Primary Examiner—Dang Ton

(57) ABSTRACT

A protocol for handling multiple access on broadband communication networks, e.g., fiber/coax networks and wireless networks, supports both continuous bit rate (CBR) and variable bit rate (VBR) traffic representing voice, video telephony, interactive television, and data. The invention is carried out both in customer premise equipment (CPE) at stations, and in a common controller with which all stations communicate. A medium access control (MAC) processor provided in each of the stations and in the common controller divides the time domain for a given RF channel into a series of successive frames, each having a plurality of time slots. Because of the architecture of the communication network, individual stations do not communicate directly with each other, but can receive broadcast messages indicating the status of each time slot, which messages are generated in the common controller and transmitted in a downstream channel. When a station desires to transmit information in the upstream direction, it inserts the information into an available time slot, with availability being determined in accordance with time slot status. Depending upon the type of traffic being originated, a station can indicate to the common controller a need for continued use of the "same" time slot in successive frames. This permits a station, such as a station requiring a CBR connection, to avoid having to contend repeatedly for continued access to the transmission network. In the case of a wireless communication network, the invention is carried out both in mobile stations, and in a base station which acts as a common controller and with which all mobile stations communicate.

22 Claims, 13 Drawing Sheets

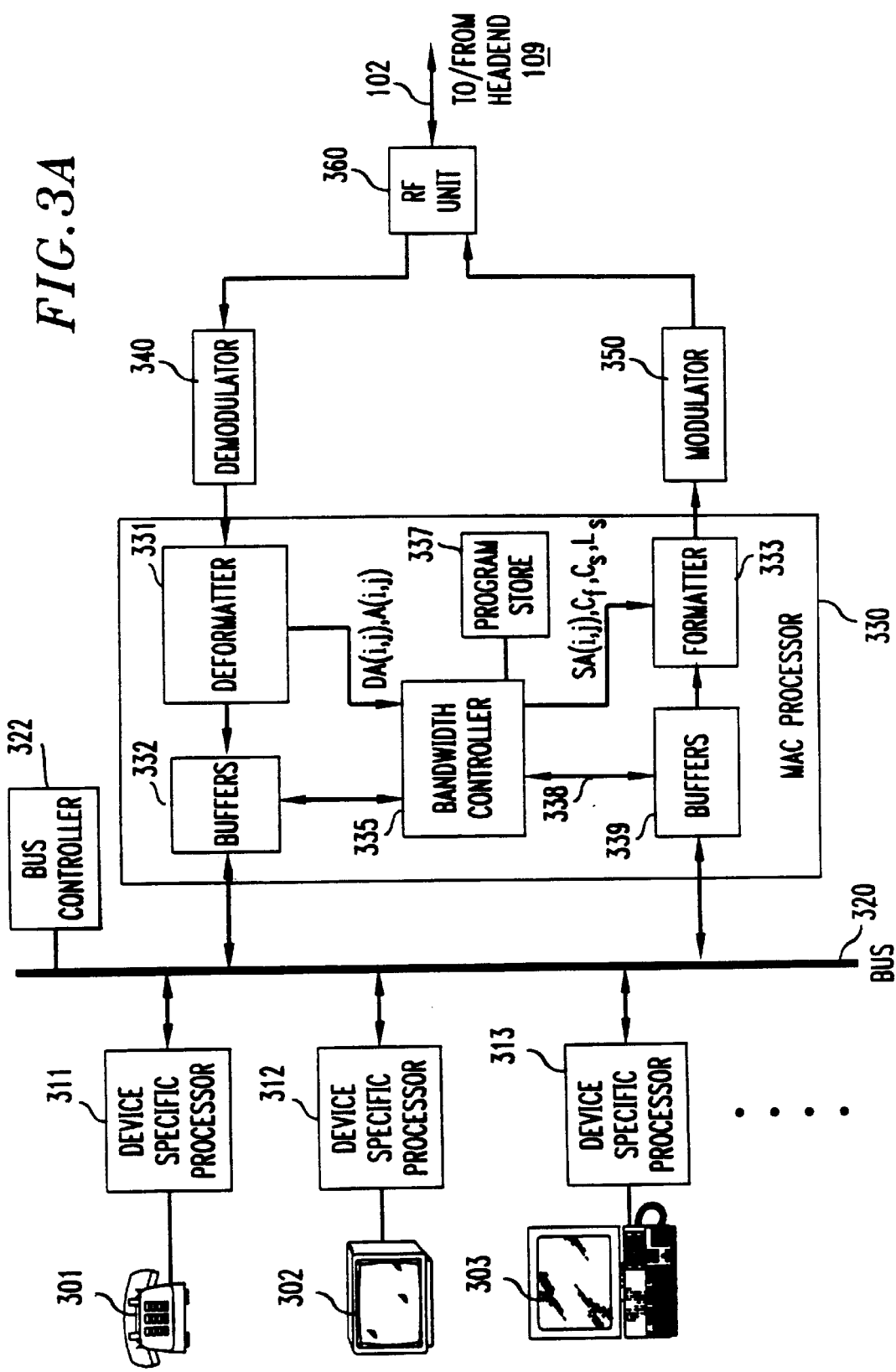

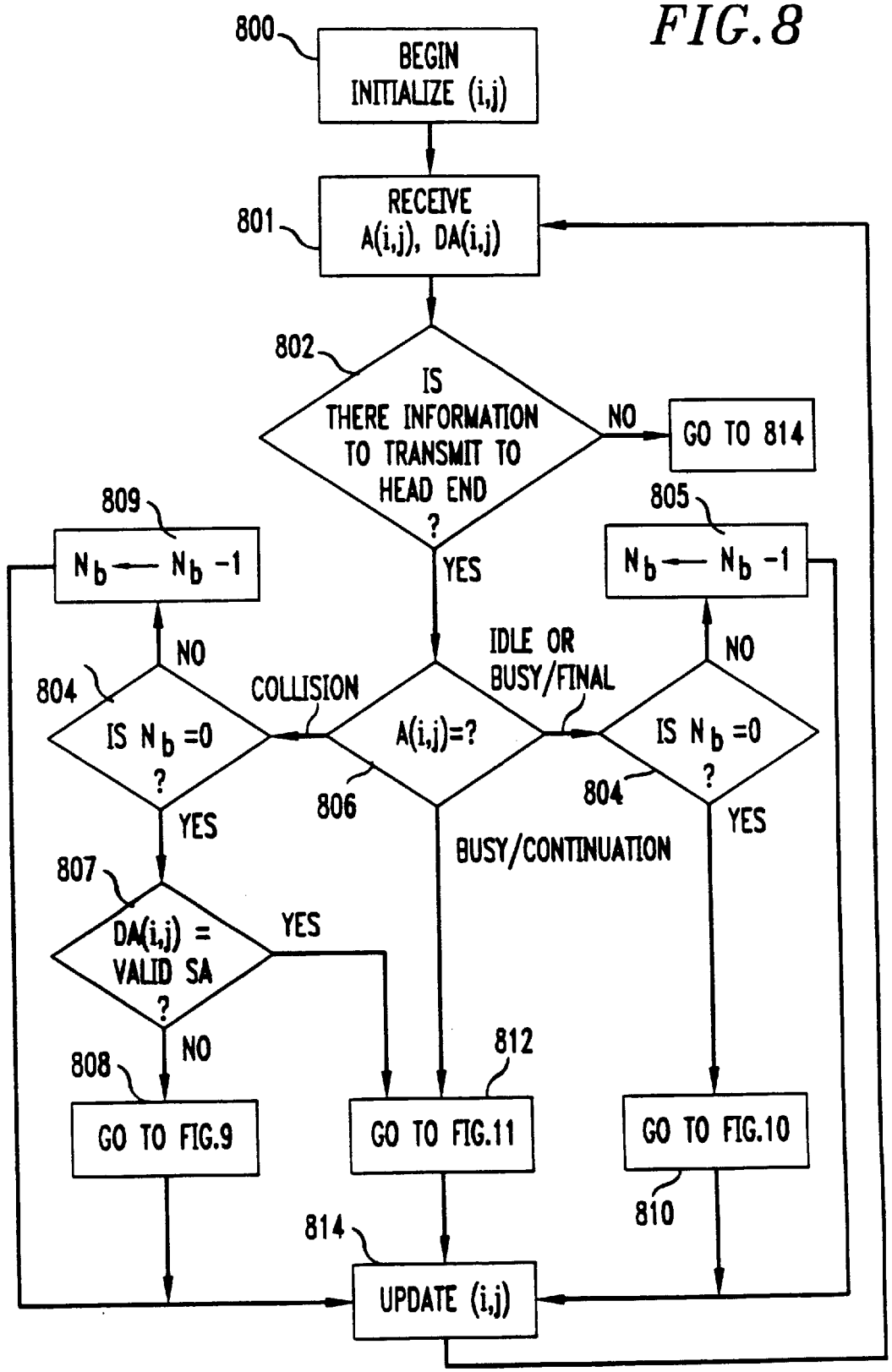

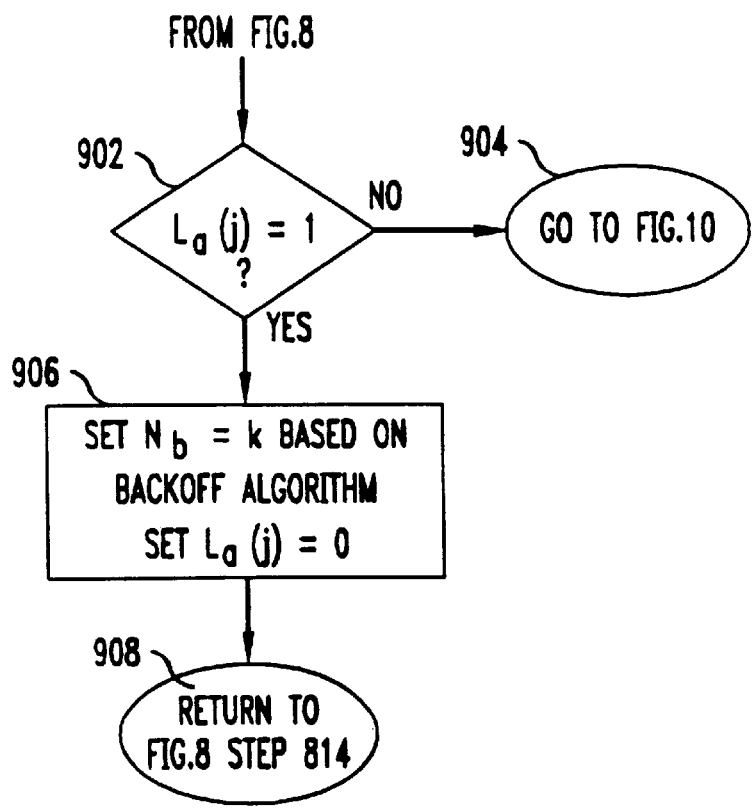
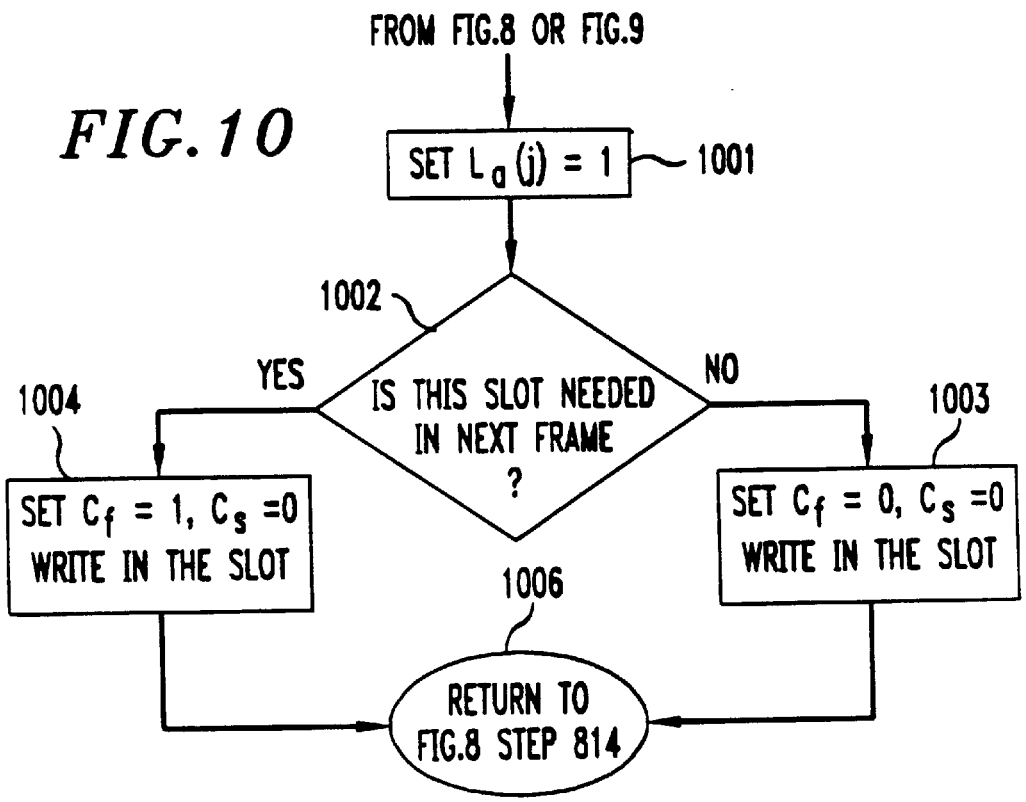

METHOD AND APPARATUS ENABLING MULTIPLE ACCESS ON A BROADBAND COMMUNICATION NETWORK

CROSS REFERENCE TO RELATED APPLICATIONS

This application is a continuation of, and claims the benefit of priority on, U.S. patent application Ser. No. 09/060,684, filed Apr. 15, 1998 by Edmon et al., entitled "Method and Apparatus Enabling Multiple Access on a Broadband Communication Network", now abandoned.

FIELD OF THE INVENTION

This invention relates generally to digital communication via a high bandwidth (e.g. fiber and coaxial cable) communication medium, and, in particular, to an access protocol and arrangement for allowing competing stations connected to a common head end via a tree and branch communication network to use upstream channels to transmit to the head end, a variety of types of information, such as voice, video-telephony, data or control information that may be synchronous, asynchronous or sporadic. The invention also relates to wireless networks, which are akin to fiber/coax networks, in that mobile stations do not usually directly listen to each other, but instead depend on a base station for feedback.

BACKGROUND OF THE INVENTION

There is currently a great deal of activity directed toward enhancing the networking infrastructure of cable television companies. The thrust is two-fold: enhancing the downstream capacity of the networks to support new services, and providing for significant upstream capacity for new interactive services, including telephony and data networking. Here, "upstream" refers to transmission from a station to a head end, and "downstream" refers to transmission from a head end to the stations.

Many current plans for providing upstream capability utilize the well known Time Division Multiple Access (TDMA) method of assigning bandwidth to stations that have invoked a signaling method to indicate to the head-end that they wish to transmit. However, existing versions of TDMA do not provide as much flexibility in the use of the available bandwidth as is desired. Also, packet data techniques do not require the strict allocation of peak bandwidth usually associated with TDMA.

Existing packet data solutions also do not extend well to the broadband cable environment. Carrier Sense Multiple Access/Collision Detection (CSMAJCD), as described, for example in Carrier Sense Multiple Access with Collision Detection (CSMA/CD) Access Method and Physical Layer Specifications, published by the Institute of Electrical and Electronics Engineers, American National Standard ANSI/IEEE Std.

802.3-1985, is arranged so that stations listen to the channel for a period to determine that it is IDLE before transmitting. This type of arrangement is very inefficient in the cable environment, because of the distances involved. The propagation delay, and corresponding dead time of the channel, is much greater in cable networks than in the Local Area Networks that are the standard CSMA/CD environment.

As another example, the slotted Aloha approach described by L. Roberts in "ALOHA Packet System With and Without Slots and Capture", Computer Communications Review, April 1975, specifies a system arranged so that time is divided into a series of exact slot periods. Any station that has data may transmit at any time. When collisions occur, stations back off and retransmit according to some randomized algorithm. This approach has also been enhanced with a reservation scheme in which once a station acquires a slot, it can keep successive slots by setting a header field; the station may also signal that it has finished transmitting by changing that field. See, for example, Lam, S. S., Packet Broadcast Networks—A performance analysis of the K-ALOHA Protocol, IEEE Transactions on Computers, Vol. C-29, No. 7, July 1980, 596–603. Here again, the problem is that in the coax/fiber infrastructure under consideration, it is difficult to allow stations to directly listen to each other. Also, the unique tree and branch structure of the cable network requires that a new approach be used.

SUMMARY OF THE INVENTION

In accordance with the present invention, a protocol for handling multiple access on broadband fiber/coaxial cable networks is called "Slotted Occupancy Sense Multiple Access with Centralized Collision Detection" or "SOSMW" for short. SOSMA, which supports both continuous bit rate (CBR) and variable bit rate (VBR) traffic representing voice, video telephony, interactive television, and data. In the case of a coaxial cable or fiber tree and branch communication network, the present invention is carried out both in customer premise equipment (CPE) at stations, and in a common controller, which may be a head end with which all stations communicate. A medium access control (MAC) processor provided in each of the stations and in the common controller or head end 'divides the time domain for a given RF channel into a series of successive frames, each having a plurality of time slots. Because of the architecture of the communication network, individual stations do not communicate directly with each other, but can receive downstream broadcast messages indicating the status of each upstream time slot. These status messages are generated in the common controller or head end, and are transmitted in a broadcast downstream channel so that all stations can receive them. When a station desires to transmit information in the upstream direction, it inserts the information into an 'available' time slot, with availability being determined in accordance with time slot status. Depending upon the type of traffic being originated, a station can indicate to the common controller or head end a need for continued use of the "same" time slot in successive frames. This permits a station, such as a station requiring a CBR connection, to avoid having to contend repeatedly for continued access to the transmission network. In the case of a wireless communication network, the present invention is carried out both in mobile stations, and in a base station which acts as a common controller and with which all mobile stations communicate.

In one embodiment of the invention, acknowledgment or status messages, transmitted in a broadcast downstream channel from the common controller or head end, indicate that a particular time slot status is (a) IDLE, (b) BUSY/CONTINUATION, meaning that a station has a need for continued use of a slot, (c) BUSY/FINAL, meaning that the continued use of a slot has come to an end, or (d) COLLISION, meaning that a collision has occurred with respect to that slot. The IDLE status message occurs when the common controller or head end does not detect any information in a time slot. The BUSY/CONTINUATION message occurs when a transmission was successful, and the station originating the transmission had set the frame continuation bit. The BUSY/FINAL message occurs when a transmission was successful, and the station originating the transmission had set the frame continuation bit to "final". The COLLISION status message is formed in the head end by determining that at least one other station connected to the transmission medium may also have attempted a transmission in the same time slot. In a station needing access to one or more time slots on the transmission network, a slot may be considered to be available if the downstream message corresponding to that slot indicates either an IDLE, COLLISION or BUSY/FINAL status.

If a station needs access to more than one time slot in each of a plurality of successive frames, there are several approaches that may be used. First, a station may acquire a first time slot, and then seek second and subsequent time slots by repeating the time slot contention process. In this type of decentralized approach, a station can thus progressively "ramp up" to obtain the full amount of transmission bandwidth that is needed for the type of traffic being originated in that station. In order to avoid deadlocks, a timer can be used to terminate the call attempt for any station that does not obtain the required number of time slots within a predetermined time period. Alternatively, a station can indicate, in the first upstream signaling message to the head end, that multiple time slots over successive frames are needed. In this type of centralized approach, the head end is arranged to pre-assign the needed slots if they are available, and indicate the assignment in a downstream message.

In accordance with an aspect of the invention, to prevent interference between time slots and to allow ramp up time for transmitters, a guard time is provided between transmit time slots in the upstream direction. However, to increase efficiency, multiple occurrence of the guard times is eliminated in "superslots' that are formed when multiple adjacent time slots in each frame are assigned to a station. These superslots can significantly improve the overall utilization of the available bandwidth on the transmission medium.

In accordance with another aspect of the invention, common controller or head-end based feedback (as opposed to stations listening to the channel for feedback about slot occupancy) can be used to assign time slots and create superslots.

While our invention has thus far been primarily described in the context of a fiber/coax based transmission infrastructure, it is to be understood that the invention is also applicable to a wireless communications environment. In the latter situation, the terms "mobile station", "base station" and "wireless medium", would be applicable in place of the terms "station", "head end" and" fiber/coax medium".

As a result of the above, a station can autonomously declare its allocated contiguous slots to be used in a superslot mode so as to save bandwidth. This provides for a more efficient, and more economic, use of the channel.

BRIEF DESCRIPTION OF THE DRAWING

FIG. 3A illustrates the arrangement by which various communications devices in the stations of FIG. 1 are connected to the transmission network as well as the arrangement of the Medium Access Control (MAC) processor in accordance with our invention.

FIG. 8 is a flow chart illustrating the initial processing of acknowledgment messages received in a MAC processor indicating time slot status;

FIG. 9 is a diagram illustrating the steps taken when downstream acknowledgment indicates a collision, FIG. 10 is a diagram illustrating the steps taken when downstream acknowledgment indicates that a time slot is available either due to an IDLE or BUSY/FINAL condition, or the situation in which a collision has occurred because two stations transmitted simultaneously or there was noise on the transmission medium;

DETAILED DESCRIPTION

Figure 1:
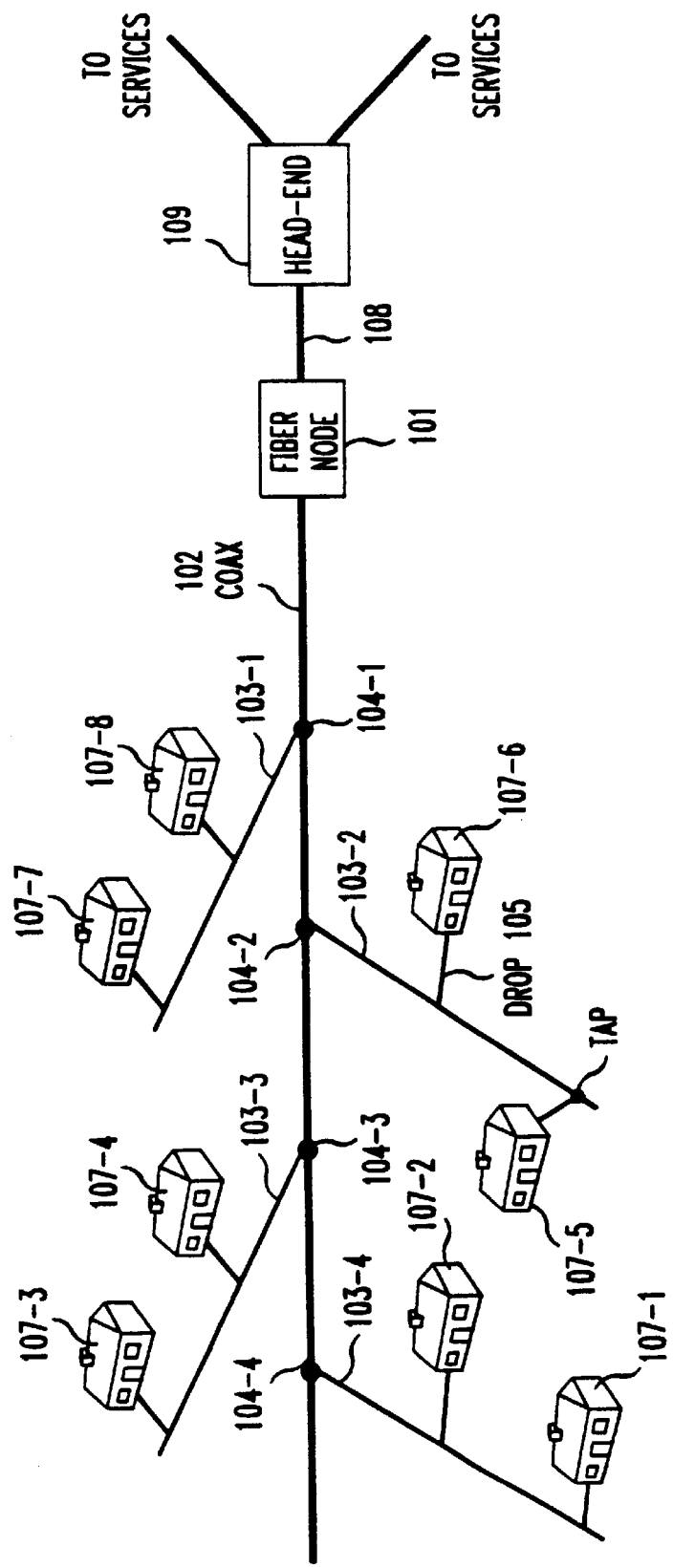
FIG. 1 illustrates the overall arrangement of a broadband network in which a plurality of stations are interconnected with a common controller called a head end, by a tree and branch transmission network, and in which the present invention may be used.

The type of broadband network being addressed by our invention is shown in FIG. 1, in which a plurality of stations 107-1 to 107-8 are connected to a common head end 109 by a tree and branch transmission network. The transmission network can include a main coaxial cable 102 having a plurality of taps 104-1 to 104-4, each of which serves a corresponding feeder cable 103-1 to 103-4. Each feeder cable in turn serves one or more of the stations 107 via a drop, such as drop 105. The network in FIG. 1 includes a single fiber node 101 which permits a transition between main coaxial cable 102 and an optical fiber 108. However, it is to be noted that the entire network can consist of coaxial cable in some implementations, and in others, more than one such fiber node can be employed in the network, depending upon which portions of the network are fiber and which are coaxial cable.

By virtue of the tree and branch arrangement illustrated in FIG. 1, individual stations cannot communicate directly with each other, and conventional access protocols cannot be used efficiently. Rather, each of the stations communicates in the upstream direction with a common controller or head end 109, while the head end can broadcast downstream to all of the stations or transmit selectively to certain stations, using well known addressing techniques. The arrangement is further assumed to include unidirectional amplifiers, not shown, that also prevent all stations from hearing all other stations. A typical network of the type shown in FIG. 1 may involve distances in the range of 100 miles from the farthest station to head end 109.

The traffic anticipated in coax/fiber networks of the type shown in FIG. 1 can be broadly classified as isochronous or constant bit rate (CBR), asynchronous or variable bit rate (VBR), and sporadic (occasional bursts of one or more packets or cells). Examples of isochronous traffic are voice and video telephony (VT), which are delay sensitive. Sometimes, a delay insensitive service like file transfer may also be served using a isochronous or CBR connection. Examples of asynchronous or VBR traffic are VBR video and interactive data. VBR video can be transported asynchronously through the network, but it requires resynchronization at the receiving station before display on a video monitor. The asynchronous or VBR traffic is bursty due to variations in activity/inactivity periods and potentially variable bit rates during the activity periods. The sporadic traffic is also bursty but it is characterized by relatively long inactivity periods followed by bursts of one or a few packets. Examples of this type are VCR remote control messages, video game button pushes, and call set-up messages containing signaling and control information.

Figure 2:
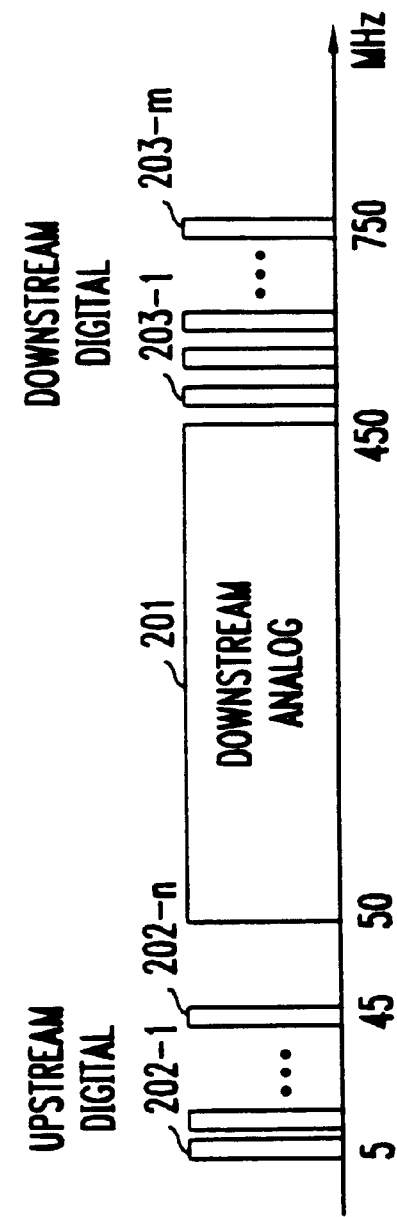
FIG. 2 illustrates the upstream/downstream spectrum allocation that may be used in the transmission medium interconnecting the stations shown in FIG. 1.

FIG. 2 illustrates the upstream/downstream spectrum allocation that may be used in the transmission network interconnecting stations 107 to head end 109. Assuming that a total bandwidth of at least 750 MHz is available on all of the components of the network, a 400 MHz band 201 from 50 MHz to 450 MHz may be used to carry conventional downstream analog information, such as conventional cable TV programming. A 40 MHz band between 5 and 45 MHz can be divided into a plurality of upstream digital channels 202-1 to 202-n, each of which can be 1 MHz to 6 MHz wide, and capable of carrying 1.6 Mb/s to 10 Mb/s digital bandwidth when used with a suitable modulation scheme. Each of these upstream digital channels can be used for carrying control, signaling, voice, video telephony and other messages in the upstream direction. A larger number, typically 50, of downstream digital channels 203-1 to 203-m can be included in the 300 MHz band between 450 and 750 MHz. These channels can be used for the downstream component of voice, video telephony, video on demand (VOD), and other interactive (ITV) services. Due to the lower noise in the downstream channels (as compared to the upstream channels), with suitable modulation schemes, it is possible to carry up to 28 Mb/s in each of the downstream channels 203-1 to 203-n. The upstream channels 202 are shared by the stations 107 using a multiple access method such as described by the present invention. The downstream channels 201 and 203 are broadcast channels in that all stations 107 can receive the messages transmitted in those channels.

Figure 3B:
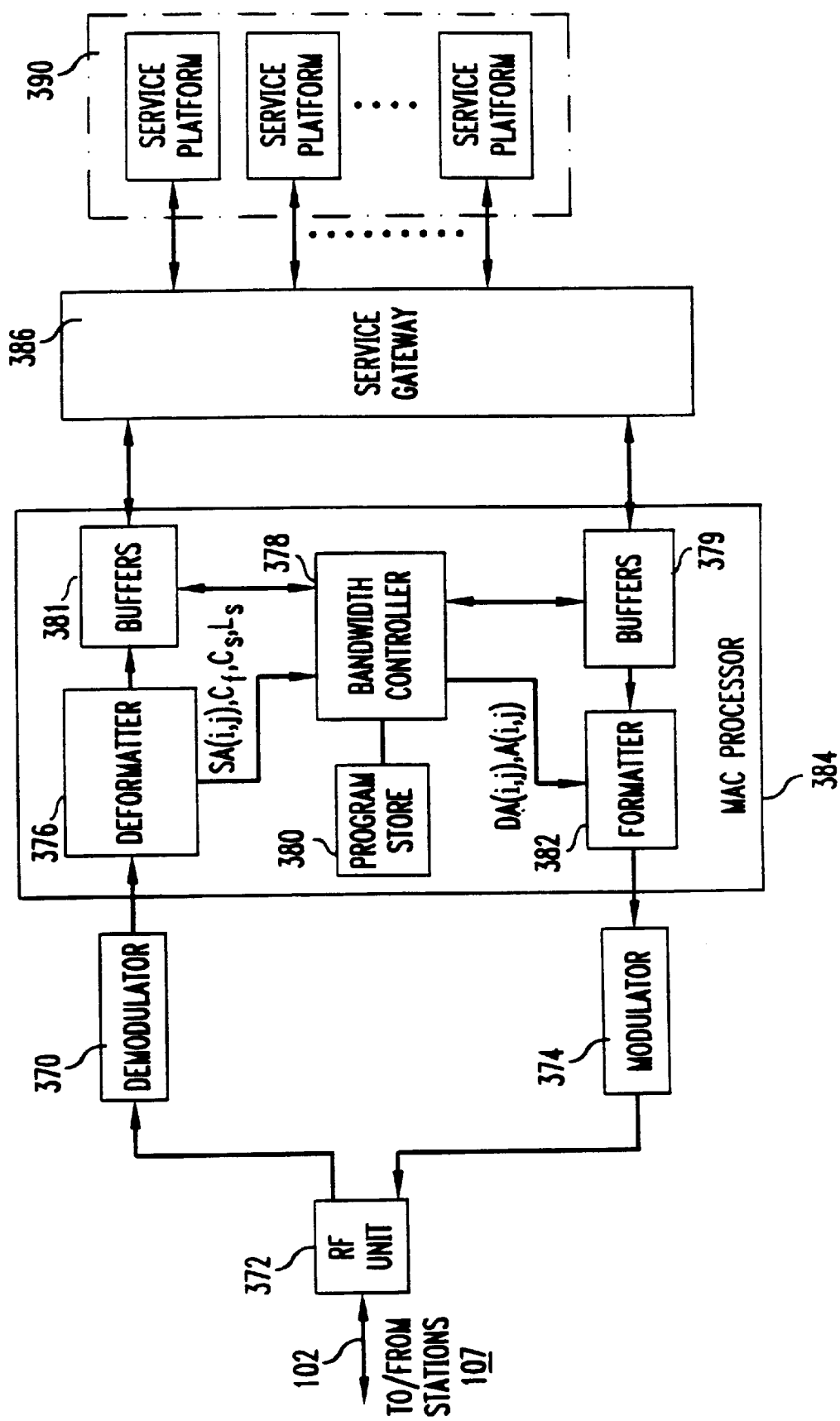
FIG. 3B illustrates the arrangement of a MAC processor similar to the one shown in FIG. 3A, which is disposed in the head end of FIG. 1, and which directs communications signals between the stations and the appropriate service platforms.

Before describing the specific arrangement of the stations 107 (FIG. 3A) and head end 109 (FIG. 3B), and the specific components in upstream (FIG. 4) and downstream (FIG. 5) messages exchanged between the stations and the head end, it will be instructive to present an overall view of the operation of these elements in connection with the present invention. In accordance with the principles of the present invention, bandwidth controller 335 in MAC processor 330 in stations 107 in FIG. 3A, and a similar bandwidth controller 378 in MAC processor 384 in head end 109 in FIG. 3B, are arranged to implement a protocol with respect to information transmission on the interconnecting tree and branch network whereby a station 107 can insert information in a particular time slot in an upstream channel as long as the time slot is an unreserved slot. Any station that tries to transmit in a time slot reads the status information associated with that slot that is contained in a broadcast downstream channel. If a slot is not reserved, a station can insert information, if a slot is reserved for another station, the station abstains from transmitting in that time slot, if the station detects that its own transmission experienced a collision, then the station attempting the transmission executes a backoff and retransmit process.

Figure 5:
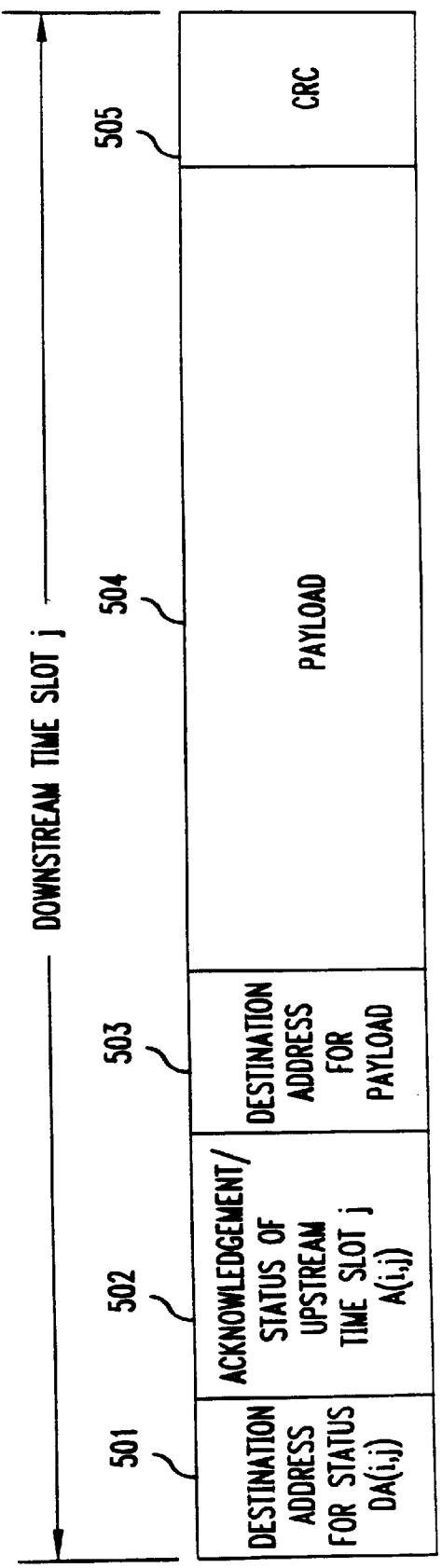
FIG. 5 illustrates the arrangement of the data fields in a downstream message contained within a time slot.

Four time slot conditions, which are discussed in more detail below, may be indicated in a downstream status or acknowledgment message (FIG. 5). First, a slot may be IDLE, meaning that the slot was unused in the last frame and is available for transmission by any station. Second, the slot may be marked as Busy/Continuation, meaning that the slot was busy in the last frame and is reserved in the next frame for the same station. Third, the slot may be marked as Busy/Final, meaning that the slot was busy in the last frame, but is available in the next frame for any station. Finally, the time slot may be corrupted because the slot did not have meaningful data due to collisions or noise.

Figure 4:
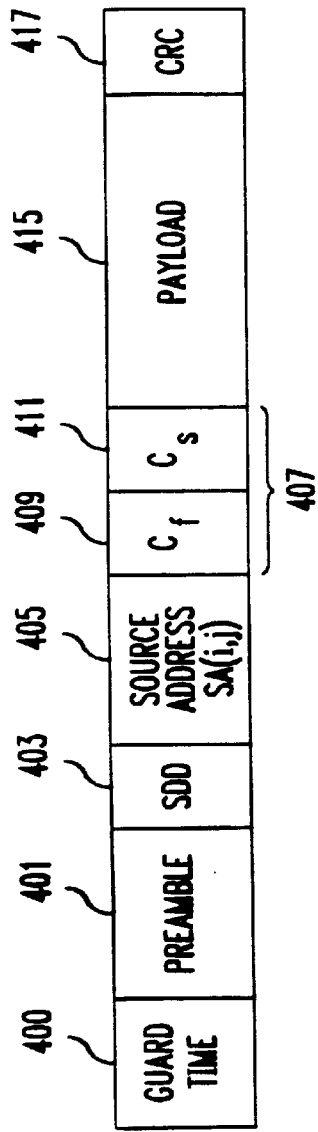
FIG. 4 illustrates the arrangement of the data fields in an upstream message contained within a time slot.

Further in accordance with the invention, stations that have transmitted in a slot 25 may set a frame continuation ($C_f$) subfield 409 in FIG. 4 in an upstream header, to indicate reservation of the same slot time in the next frame. This provides a mechanism for stations that require a synchronous access to get guaranteed bandwidth upstream. Stations with enough data may also use the frame continuation subfield to obtain capacity to transmit Variable Bit Rate (VBR) type traffic. For synchronous traffic, a station 107 that first transmits in one or more time slots is arranged to set the frame continuation ($C_f$) subfield 409 in every succeeding frame, until the end of the call. For a VBR service, the station would be expected to set it a few times, such as might be required to transmit an IP packet, then relinquish the slot.

Sometimes, when a station has access to contiguous time slots in an upstream frame, it can combine those time slots into a "superslot" by transmitting across boundaries of the available time slots. In this case, the station signifies the use of superslots by setting a slot continuation (Cs) subfield 411 in FIG. 4 in the upstream header.

FIG. 3A illustrates the arrangement by which various communications devices in stations 107 of FIG. 1 are connected to the transmission network and can, in accordance with the invention, access transmission capacity in upstream channels 202 in order to communicate with head end 109. The communications devices in a station may include a telephone 301, a television 302, a computer 303, and many other devices. Each device is connected to a common bus 320 via an associated device specific processor 311–313. Thus, telephone 301 is coupled to bus 320 via processor 311, which, for example, converts PCM voice to analog signals; television 302 is coupled to bus 320 via processor 312, which, for example, converts a MPEG-2 digital TV signal to an analog signal; and computer 303 is coupled to bus 320 via processor 313 which, for example, provides conversion between user and network protocols.

With respect to upstream information, each of the device specific processors 311-15 313 processes the data originated in its associated communication device, and presents the data in the proper form for application to an RF unit 360 that enables a connection to cable 102. With respect to downstream information, each of the device specific processors 311–313 processes data destined for display/play-out at the associated "communications device (telephone 301, television 302, computer 303, etc.). For example, processor 312 connected television 302 may do MPEG-2 decoding of video information.

Transfer of data between bus 320 and a media access control (MAC) processor designated generally as 330 (described in more detail below), as well as between device specific processors 311–313 and bus 320, is performed under the control of a bus controller 322. Bus 320 and bus controller 322 may be arranged to use a standard time slot interchange (TSI) or Ethernet protocol, or any other suitable arrangement that will be apparent to a person skilled in the art.

A modulator 350 and a demodulator 340 are provided in each station to modulate upstream information and demodulate downstream information, respectively. For example, demodulator 340 and modulator 350 may be arranged to convert an analog signal to a digital bit stream (and vice-versa) using any of the well known techniques such as QPSK, QAM, etc. RI unit 360 operates in both directions; it converts the RI signal received from head end 109 down to baseband and feeds it to demodulator 340, and converts the baseband information received from modulator 350 up to the assigned RI frequency for transmission to head end 109. It is to be noted here that the functions performed by RI unit 360 as well as demodulator 340, modulator 350, and potentially MAC processor 330, can be included or embodied in a single unit, sometimes referred to as a "network interface unit".

In accordance with the present invention, information originating in any of the communications devices 301–303 connected to bus 320 and destined for the head end 109 of FIG. 1 is applied to cable 102 and to the other components of the transmission network under the control of MAC processor 330, which implements the MAC layer protocol of the present invention. Likewise, downstream information from head end 109 that is destined for the devices 301–303 is received from the transmission network and cable 102, also under the control of MAC processor 330. The elements of MAC processor 330 are a deformatter 331 and a corresponding formatter 333, both of which operate under the control of a bandwidth controller 335, buffers 332 and 339, and a program store 337 that contains the program or software code that controls the operation of controller 335.

Deformatter 331 separates payload data and the acknowledgment message, A(i,j), sent from head end 109, and sends the payload data to buffers 332, from where they are sent to the appropriate device specific processor 311–313 over bus 320, depending upon the destination address, DA(i,j) for the appropriate communications device 301–303 that is contained in the message. Formatter 333 performs the inverse operation, namely it combines payload data originated in the communications devices 301–303 and/or the device specific processors 311–313 and control messages, $C_f$, Cs and Ls, originated in bandwidth controller 335, and sends these messages, as well as the source address, SA(i,j) indicating the identity of the originating communications device, to head end 109. The control/status messages DA(i,j), A(i,j), SAQ,j), $C_f$, and Ls are described below in connection with FIGS. 4, 5 and 7.

Both formatter 333 and deformatter 331 operate in conjunction with bandwidth controller 335, which performs functions that include (a) scheduling transmission of packets from buffers 338 to formatter 333 and from formatter 333 to RF unit 360 based on the slot status messages (acknowledgments) received from head end 109, (b) forming superslots, (c) controlling the contention process, (d) performing error checking using cyclical redundancy codes (CRC's) contained in each time slot. The details of these processes, which, as stated previously, are performed under the control of software programs stored in a program store 337, are described below in connection with FIGS. 8 through 12. Buffers 339 and 332 are arranged to store upstream and downstream payload data on a temporary basis, and to store parameter information used in the bandwidth allocation and management processes that form part of the MAC protocol.

While stations 107 transmitting VBR traffic may reserve some guaranteed bandwidth for the duration of a call or session, they can, in accordance with our invention, dynamically seek additional bandwidth or release spare bandwidth based on instantaneous variations in source activity, i.e., the rate at which the station produces digital information that is to be transmitted. This capability is implemented as follows.

The bandwidth controller 335 in each station 107 monitors the fill in one of the 5 buffers 339 that is associated with a particular VB connection and that is used for temporarily storing the information from the VBR source. Bandwidth controller 335 is arranged to predict the changes in the number of slots needed to ensure proper flow of the information to head end 109, because, during high activity periods, a buffer fill signal on line 338 is high. The prediction algorithm implemented in bandwidth controller 335 then calls for the station to acquire some more slots by contending for those slots. If the station does acquire one or more additional time slots, the frame continuation bit can be set for these slots, thereby reserving the same slot in successive frames. During low activity periods, the buffer fill signal on line 338 is low. The prediction algorithm in bandwidth controller 335 then calls for some of the extra slots that exceed the guaranteed minimum to be relinquished by the station. This arrangement allows for a higher gain from statistical multiplexing of the VBR sources, which results in significantly more capacity for the present invention over the conventional TDMA.

FIG. 3B illustrates the arrangement of a MAC processor 384, which is similar to MAC processor 330 shown in FIG. 3A. MAC processor 384 is disposed in the head end of FIG. 1, and which directs communications signals from stations 107 to appropriate service platforms 390. As shown in FIG. 3B, signals received from stations 107 via coaxial cable 102 are applied to RF unit 372, which, like RF unit 360, converts the RI signals down to baseband and feeds it to demodulator 370, and converts the baseband information received from modulator 374 up to the assigned RF frequency for transmission to stations 107. RF unit 372 may also provide COLLISION or IDLE status detection, based on power level analysis. If these functions are performed in RF unit 372, the resulting control signals are transmitted to the MAC processor 384 via a control connection (not shown in FIG. 3B).

In MAC processor 384, deformatter 376 recovers station address, SA(i,j), and parameters $C_f$, and $L_s$ from the upstream time slots and applies this information to bandwidth controller 378. Bandwidth controller 378 performs functions that complement the functions performed in bandwidth controller 335 of FIG. 3A, and include (a) scheduling transmission of packets from service platforms 390 via buffers 379 to formatter 382 and then to RF unit 372 based on the downstream time slot allocations formulated in head end 109, (b) detecting the presence of superslots and extracts or reads the information contained therein, (c) determining the status of upstream time slots and formulating downstream status or acknowledgment messages, A(i,j), and (d) performing error checking using cyclical redundancy codes (CRC's) contained in each time slot. The details of these processes, which, as stated previously, are performed under the control of software programs stored in a program store 380, are described below in connection with FIG. 13. Buffers 379 and 381 are arranged to store downstream and upstream payload data on a temporary basis, and to store parameter information used in the bandwidth allocation and management processes that form part of the MAC protocol.

Service gateway 386 shown in FIG. 3B maintains information regarding subscribers, service providers, and routing information for their services platforms, and provides an interface between MAC processor 384 and service platforms 390. These service platforms can be located at separate sites apart from head end 109, and therefore illustratively are interconnected with gateway 386 via a public switched telecommunications network (PSTN). Gateway 386 operates in conjunction with the MAC processor to recognize the needs of different applications originating from stations 107, and routes communications signals corresponding to these different applications to appropriate ones of the service platforms 390. For example, video on demand (VOD) requests originated in a station 107 would be routed through service gateway 386 to a VOD service platform, while voice calls would be routed through the gateway 386 to a LEC switch, which acts as a different type of service platform for voice calls.

Referring to FIG. 4, the basic arrangement of the data contained in a time slot in accordance with the invention is shown. A preamble 401 allows synchronization of the receiver in head end 109 to the time slot. A start data delimiter (SDD) 403 indicates where slot information is going to start. A source address (SA) 405 allows head end 109 to identify the particular station, communications device 301–303 or device specific processor 311–313 from which the transmission originated. The continuation field designated generally as 407, has two subfields. One, called frame continuation ($C_f$) subfield 409, indicates an intention by a station during processing of the current frame "i" to use the same slot, i.e., slot "j", in the next frame, frame "i+1". In this context, the "same" time slot, slot "j", means the slot that is in the same relative position in frame "i+1" as the time slot used in the first frame, frame "i", acquired by that station. The value of $C_f$ for time slot j in frame I is designated as $C_f(i,j)$ and is set, by default, to 0, indicating that the same time slot in successive frames is not being used by a station, when $C_f(i,j)=1$, then a station desires to use, or has been using, a time slot in successive frames.

The other subfield, called the slot continuation ($C_s$) subfield 411, indicates the 35 intention by a station to transmit across time slot boundaries, in cases where the station is using contiguous slots. When a station transmits over multiple contiguous time slots while using the slot continuation feature of the present invention, a "superslot" is formed. As described in more detail below, a superslot includes a guard time, preamble and SDD only in the first time slot in the superslot. In the subsequent time slots that make up the superslot, these fields are not present. Further details of the slot continuation and frame continuation subfields 409 and 411 are provided below.

although not limited to any particular protocol, the payload 415 in a time slot can accommodate an asynchronous transfer mode (ATM) cell, i.e. 53 bytes. A cyclic redundancy code (CRC) 417 is used for the purpose of error detection and correction, and covers all of the slot user data in a manner that would be well known to persons skilled in the art. Finally, a guard time 400 is included in each time slot, either at the beginning (as shown in FIG. 4) or end of the time slot, in order to allow for time differences caused by propagation delay as messages are carried by the transmission medium from station 107 to head end 109.

All stations 107 on the coaxial cable 102 initially go through a coarse ranging is process with head end 109, so that they have the same view of timing with respect to the time slots that appear on the transmission medium provided by coaxial cable 102 and fiber 108. This timing synchronization, which is performed in accordance with techniques well known to persons skilled in the art, is then fine tuned with the help of the guard time 400 and preamble 401 within each time slot. All of this allows stations 107 to stay synchronized with the slot boundaries on the transmission medium, while accounting for their distances from each other and head end 109, and the corresponding propagation delays.

Referring to FIG. 5, there is shown the arrangement of the data fields in a downstream message contained within a time slot designated time slot '5". Field 501 contains the destination address for the status information contained in this time slot. This destination address identifies both the particular station as well as the particular device specific processor within that station, to which the status information applies. Note that the destination address for the status information is usually the same as the source address of the station that transmitted in the $j^{th}$ time slot in the previous upstream frame. However, in the event that the status message indicates a collision had occurred, the destination address for status is set to a default value of all 0's with one exception. The exception occurs when a station had previously reserved that slot by setting the frame continuation bits, in which case the destination address for the slot status is set to the source address of the station that has reserved that slot.

Field 502 contains the actual status information for the $j^{th}$ time slot in the previous upstream frame. The status can have one of the following four values: IDLE, indicating that the time slot was not used; BUSY/CONTINUATION (B/C), indicating that the time slot was successfully used by a station, with a request for continued use having been made; BUSY/FINAL (B/F), indicating that the time slot was successfully used by a station, but that the station does not need the time slot in succeeding frames; and COLLISION, indicating that two or more stations attempted to use the same time slot, or that the information in that time slot was corrupted, such as by noise.

Field 503 contains the destination address for the payload in the $j^{th}$ downstream time slot, and field 504 contains the payload itself. This destination address can, in general, be different from the destination address contained in field 501. This is because the time slots in the upstream and downstream directions for payload data do not have to be paired.

Finally, field 505 contains a cyclic redundancy code, used for error detection (and correction) purposes.

Figure 6:
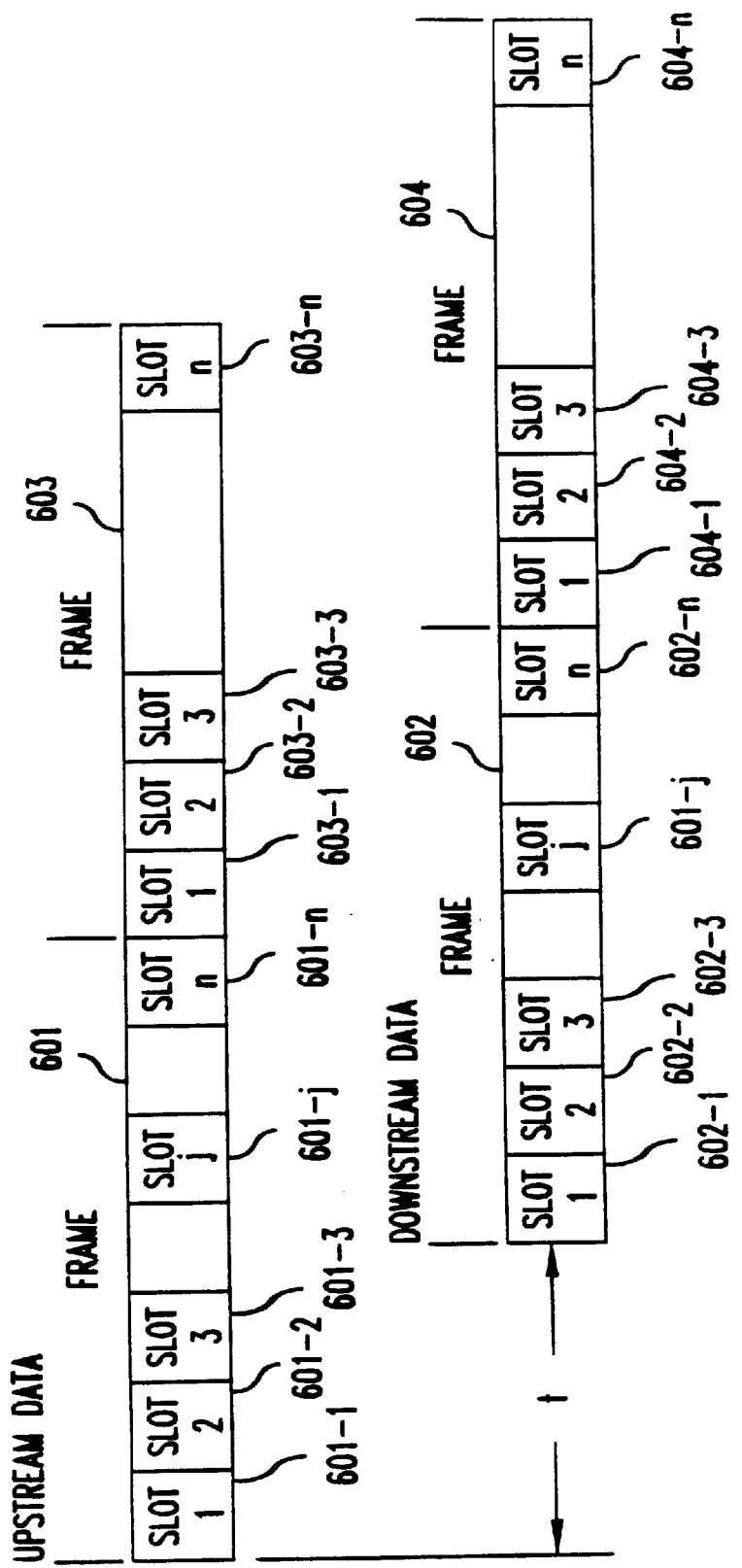
FIG. 6 illustrates the view, from the point of view of stations 107, of timing between the flow of upstream data and the flow of downstream time slot status information.

Referring now to FIG. 6, there is shown a view, from the point of view of stations 15 107, of the timing between the flow of upstream data and the flow of downstream time slot status information, which, in accordance with the present invention, is broadcast by I head end 109 in a downstream channel to all stations 107. In FIG. 6, a first upstream frame 601 contains "n" time slots 601-1 to 601-n. Guard time, which occurs between each time slot, is not shown in this figure. This frame structure assists in the synchronization required between head end 109 and stations 107 by clocking derived from frame delimiters. Note that different frame sizes (i.e., different values of "n") can be used as desired, with size and duration of the frame being determined by the communication protocol. For a 2 msec frame at a rate of 10 Mbps, there are approximately 47 slots in a frame, if data is an ATM cell with 424 bits. In applications that support voice over ATM with the present invention, such as the MAC protocol, a frame duration of 6 msecs can be used, because it takes that long to fill a 48 byte payload at 64 Kbps.

A downstream frame 602 is offset (delayed) by a time "t", and contains status information for time slots 601-1 to 601-*n* in respective time slots labeled 602-1 to 602-*n*. Thus, as will be seen in FIG. 6, the status information for a particular time slot, such as time slot 601-*i* is contained in frame 602, time slot 602-I, which occurs before the same time slot (time slot 603-1) occurs in the next frame 603. This insures that the status of a time slot for the previous frame is received by stations 107 before it is time to transmit in that slot in the next frame. Note that each time slot in each downstream frame includes a destination address (DA) for status (field 501 in FIG. 5) that identifies both the particular station for which a status message is destined as well as the particular device specific processor in that station.

Figure 7:
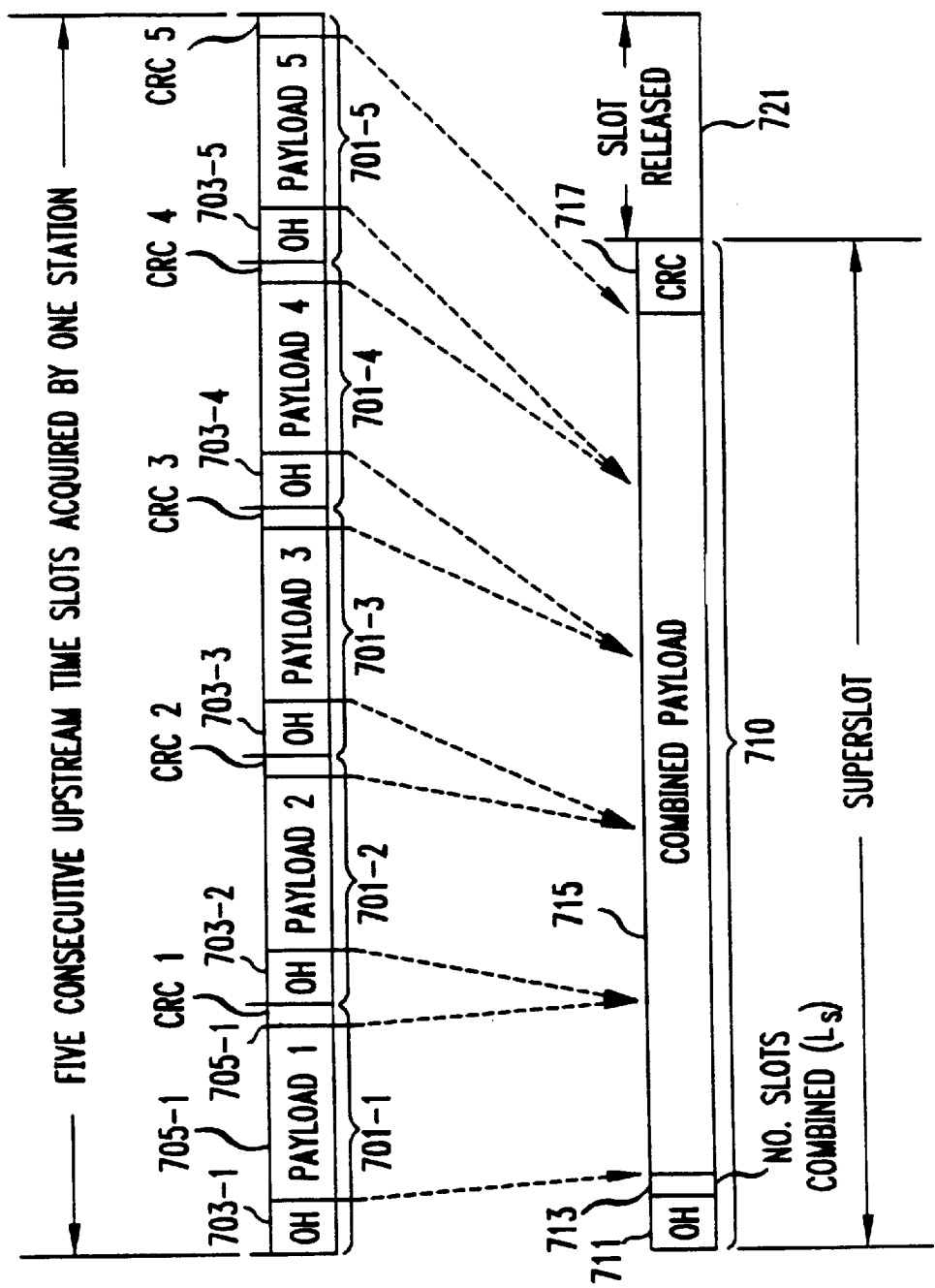
FIG. 7 illustrates the manner in which several consecutive time slots are combined to form a superslot.

FIG. 7 shows the manner in which superslots are created in accordance with our invention. As stated previously, the purpose of superslot creation is to merge consecutive or contiguous time slots and thereby release one or more time slots for use by other stations. This makes more efficient use of the channel. The reason that time slots may be released in this situation is that it is not necessary to repeat "overhead" information in each of the consecutive time slots, since the overhead information is redundant. For the present purposes, "overhead" includes information contained in fields 400, 401, 403, 405 and 407 of FIG. 4, relating, respectively, to guard time, preamble, SDD, source address and continuation subfields. In addition, a CRC is not necessary for each time slot in a combined superslot.

In FIG. 7, five consecutive upstream time slots 701-1 through 702 1-5 each include an overhead portion 703-*i* through 703-5, a payload 705-*i* through 705-S and a CRC 707-1 through 707-5. These time slots are combined into a superslot 710 that includes a single overhead portion 711, a field 713 containing information specifying the number of time slots that have been combined to form the superslot, which in this example is 5, a combined payload 715 that contains all of the payloads 705-*i* through 705-5 of the time slots being combined to form the superslot, and a CRC 717. In the superslot, overhead portion 711 may be identical to the overhead portions 703 contained in each of the time slots 701, since these each contain the same information. CRC 717 in superslot 710 pertains to the entirety of the data contained in combined payload 715.

Figure 12A:
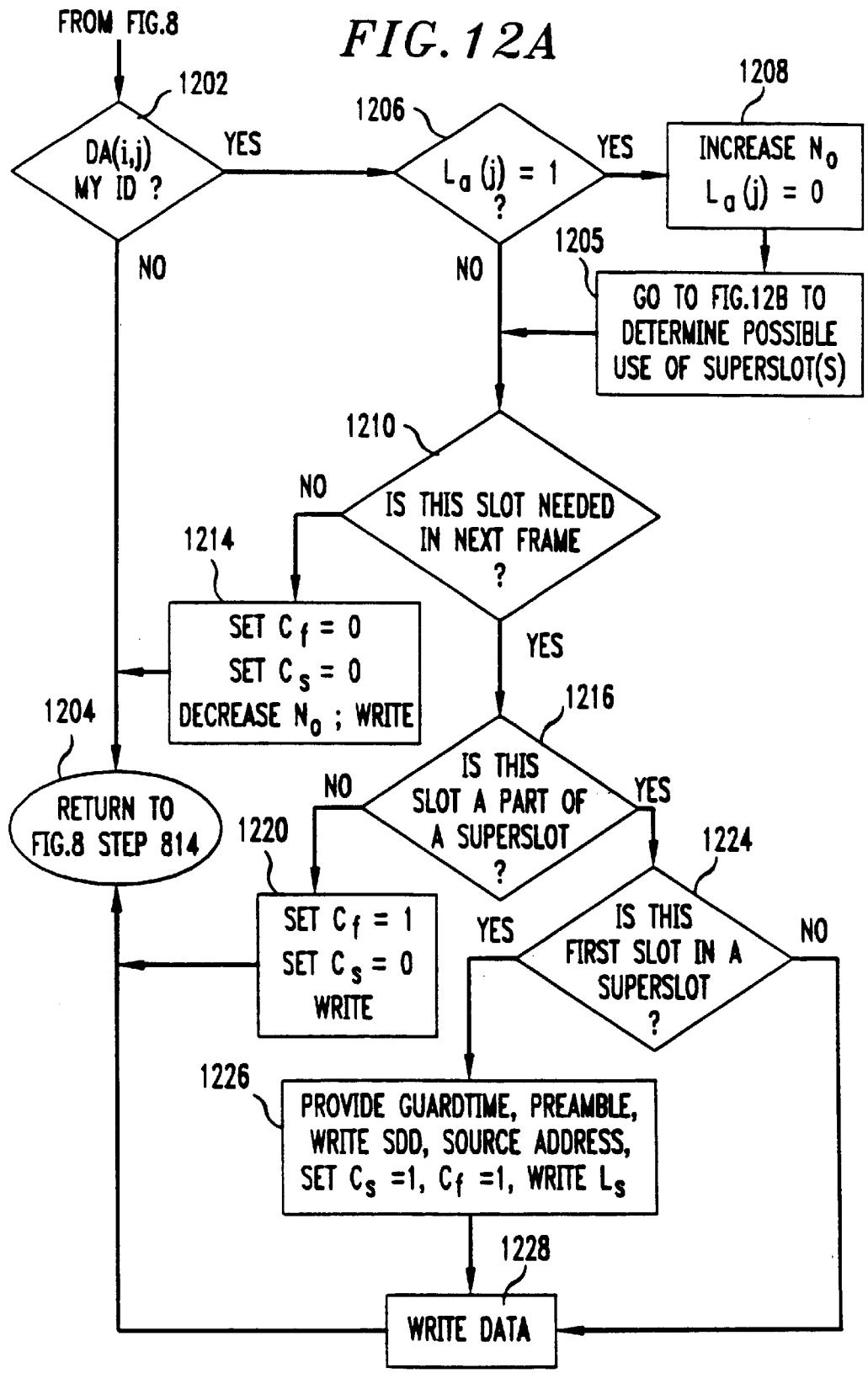
FIG. 12A is a diagram similar to FIG. 11 illustrating the process when the downstream acknowledgment indicates that a time slot has a BUSY/CONTINUATION status, but where superslots are in use.
Figure 12B:
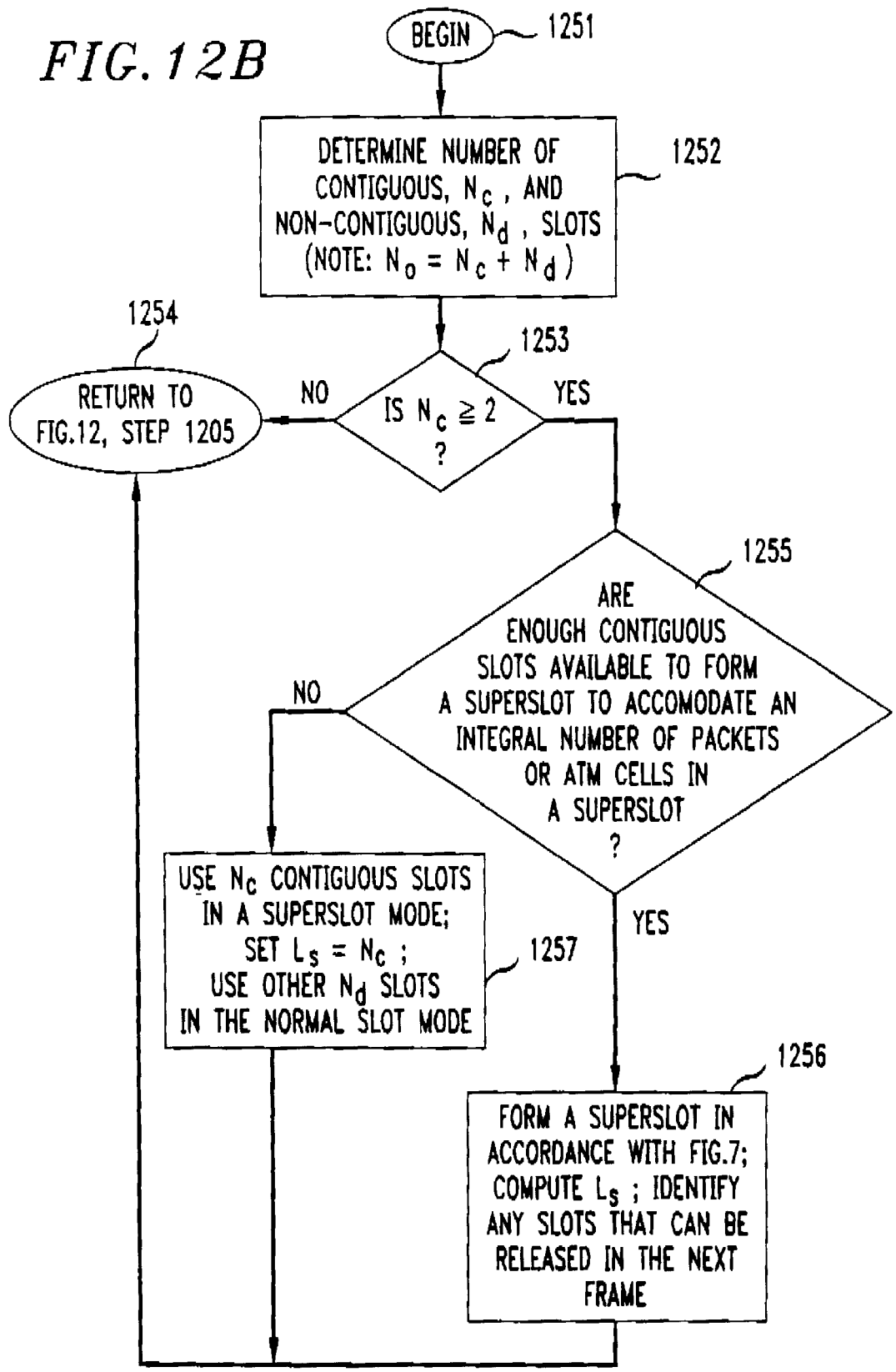
FIG. 12B illustrates the process used to determine the possible use of superslots in accordance with the present invention.
Figure 13:
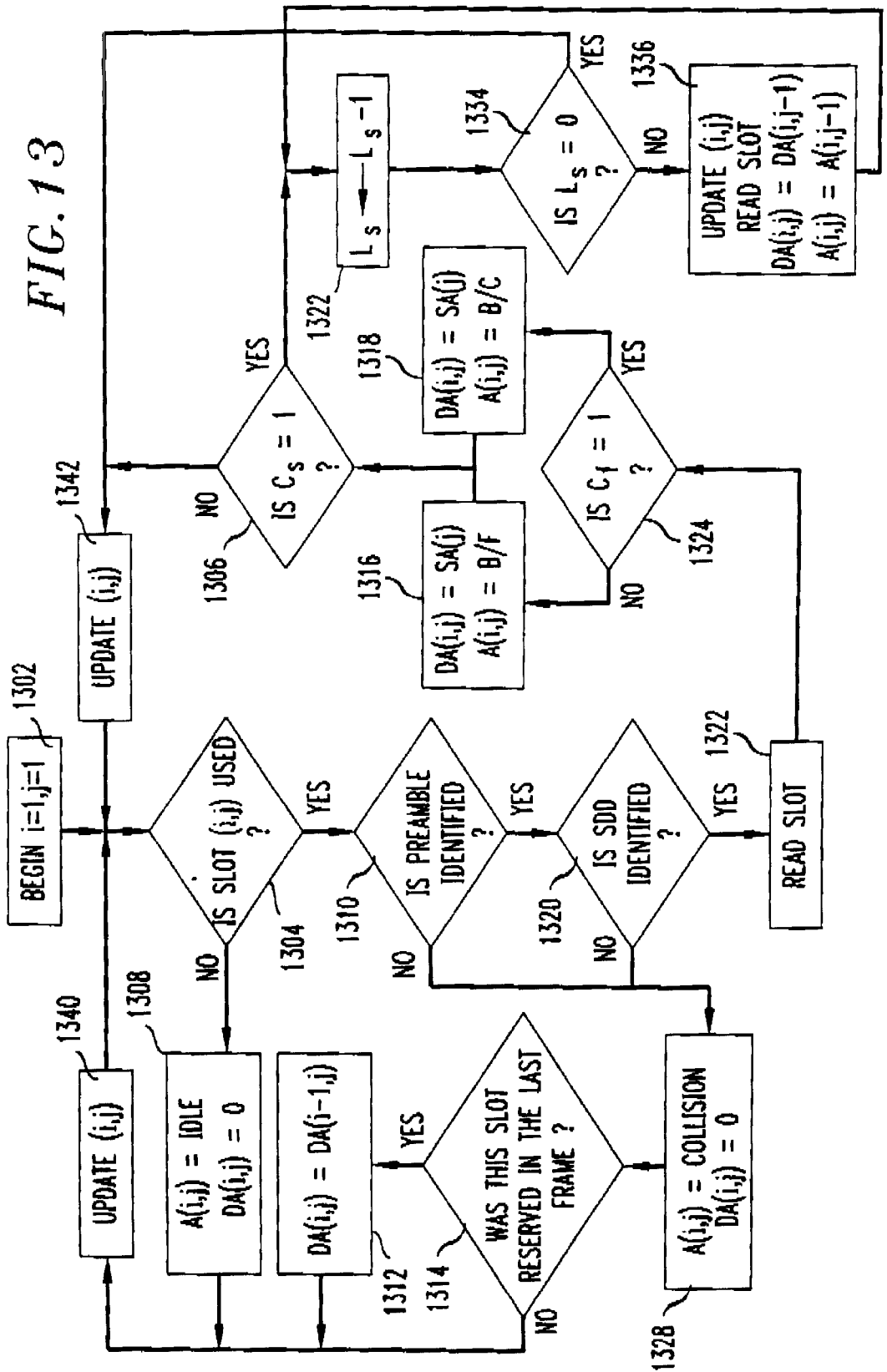
FIG. 13 shows the processing followed in head end 109 of FIG. 1.

Before describing the MAC layer bandwidth management process of the present invention, which is illustrated in the process flow charts of FIGS. 8–13, it will be instructive to present an overall view of the processes that are contemplated. When particular ones of stations 107 are ready to transmit upstream information using the MAC layer protocol, they first need to determine, based on higher layer input, how much bandwidth is needed to meet the required traffic level for the current transmission. This is accomplished in various ways, well known to those skilled in the art, depending upon the particular application involved. FIG. 8 shows the initial time slot processing and indicates passage of control to the particular figure describing the next process, depending on what the slot status is. Specifically, control passes to FIGS. 9, 10 and ii, for COLLISION, BUSY/ FINAL and BUSY/CONTINUATION statuses, respectively, If superslots are being used, the process illustrated in FIG. 12 is used instead of the process of FIG. 11. FIG. 13 shows the head end processing used to detect different conditions in the upstream time slots and to formulate the downstream acknowledgment messages.

FIG. 8 is a flow chart illustrating the initial processing of acknowledgment messages received in a MAC processor indicating time slot status. The process begins in step 800, in which variables "i", representing the frame number, and "j", representing the time slot number, are initialized to match the values maintained in the head end 109. Proper matching is achieved by a process of ranging that occurs between the head end 109 and the stations 107, in which the propagation delays in the transmission network and the filter roll-off in RF units 360 and 372 are accounted for.

When an acknowledgment message, designated A(i,j), indicating that it pertains to time slot j in frame i, that has an associated destination address represented by DA(i,j), is received in a station 107 in step 801, the station first checks in step 802 to determine if the station has information that it desires to transmit in the next time slot, i.e., time slot (i+1,j). If a negative result is obtained, indicating that the station does not have any information that it wishes to transmit upstream to head end 109, the process proceeds to step 814, in which the values of i and j are updated, in the manner indicated more specifically below. If a positive result is obtained, indicating that the station does have information it wished to transmit, the process proceeds to step 806, to determine if the acknowledgment indicates that the status of time slot in question indicates (a) a COLLISION, (b) IDLE or BUSY/FINAL, or (c) BUSY/CONTINUATION.

If the status is COLLISION, meaning that two or more stations attempted to transmit in that time slot, thereby corrupting the data therein, a backoff counter, containing a count designated as $N_b$, is checked in step 803, to determine whether or not the backoff counter for access to this slot is zero. This step determines whether the station had tried to use this time slot (U) and a collision occurred, in which case the backoff counter would have been set to a random number that is other than zero. (This is discussed further below, in conjunction with step 906 in FIG. 9) If the backoff counter is determined to be other than zero in step 803, its count is decreased by I in step 809, and the station does not transmit in the same slot in the next frame, i.e., time slot (i+1,j). Rather, the process of FIG. 8 continues with step 814, in which the values of i and j are updated, to refer to the next time slot in the same frame, i.e., time slot (ij+1). The precise manner in which updating of the values of i and j occurs, is in accordance with the following equations:

$j \leftarrow (j \bmod n)+1$ $i \leftarrow I$, if $(j \bmod n) \neq 0$ $i \leftarrow (i+1) \bmod N_f+1$, if $j(\bmod n)=0$, where n is the number of time slots in a frame and $N_f$ is an arbitrary number of frames, such as the number 1024, at which the value of i rolls over, i.e., returns to the value 1. This updating process is performed so that (a) the time slots are numbered from 1 to n and then the numbering returns to I in the next frame, and (b) the frames are numbered from 1 to $N_f$, where $N_f$ is a number that can readily be handled by the counters in the system. After updating in step 814 is completed, the process of FIG. 8 returns to step 801, in which the acknowledgment for the next time slot is received.

If the count in the backoff counter is determined in step 803 to be zero, the station proceeds, in step 807 to determine whether or not the destination address, DA(i,j), is the valid address of a station 107, rather than a null string. Head end 109 sets the value of DA(i,j) to a null string (for example, all 0's) when no station had acquired time slot j. On the other hand, head end 109 sets the value of DA(i,j) to indicate the address of a station when that station had acquired time slot j and had previously indicated a desire to continue using that time slot by setting the value of the frame continuation bit $C_f$ to 1. If the result of step 807 is negative, then, in step 808, processing continues with the process illustrated in FIG. 9, discussed in more detail below.

Figure 11:
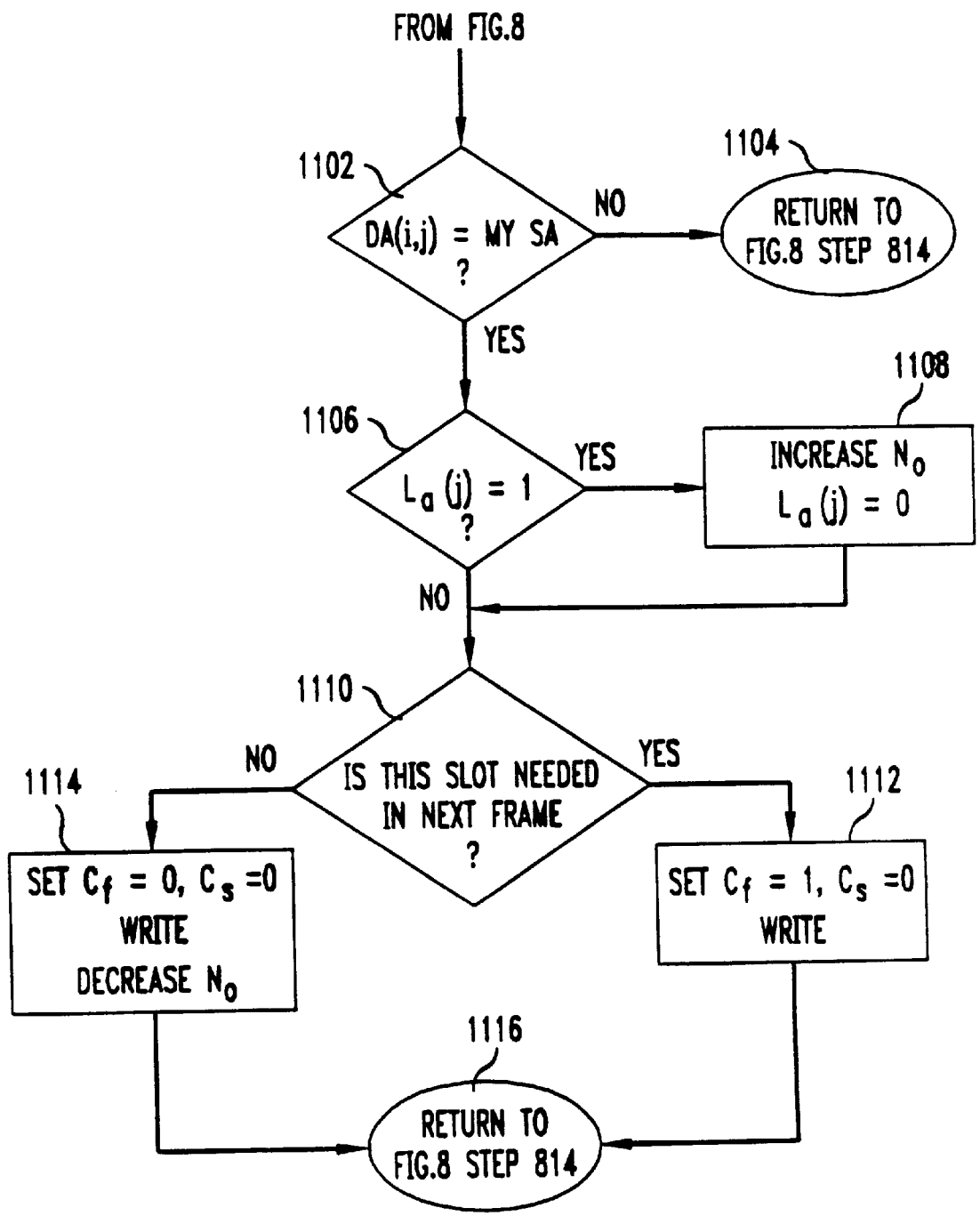
FIG. 11 is a diagram illustrating the process when the downstream 10 acknowledgment indicates that a time slot has a BUSY/CONTINUATION status, or when a collision has occurred involving a station that had reserved a time slot.

On the other hand, if the result of step 807 is positive, then, in step 812, processing continues with the process illustrated in FIG. 11.

If, in step 806, the value of A(i,j) indicates that the time slot was IDLE or BUSY/FINAL, processing proceeds with step 804, which is the same as step 803. If the value of $N_b$ is not zero, the value of $N_b$ is decremented in step 805, as described previously in connection with step 809, and the process proceeds to step 814. If the value of $N_b$ is zero, the station proceeds, in step 810, to go to the process illustrated in FIG. 10, discussed in more detail below.

If, in step 806, the value of A(i,j) indicates that the time slot was BUSY/CONTINUATION, processing proceeds, in step 812, which transfers control to the process of FIG. II.

After the processing in each of FIGS. 9, 10 and 11 is completed, control returns to step 814 in FIG. 8, wherein the values of i and j are updated as described above, and the process of FIG. 8 returns to step 801, in which the acknowledgment for the next time slot is received.

In FIG. 9, the process that occurs following a collision is illustrated. In step 902, the station first determines whether or not it transmitted in time slot (U) for the first time. This is done by examining the value of an "initial attempt" indicator designated $L_a(j)$, which is set high (to a value I) if a transmission attempt was made by the station in time slot (i,j), in order to initially acquire control of that time slot, If a positive result occurs in step 902, a randomized backoff value "k" is calculated for $N_b$ in step 906, and the value of the indicator $L_a(j)$ is reset to 0. This is done so that the station will wait for a random number of time slots before again attempting to transmit, i.e., to acquire a time slot to transmit information to head end 109. The process then, in step 908, returns to step 814 in FIG. 8.

If a negative result occurs in step 902, this could be because (a) two or more other 5 stations attempted to insert data in the time slot, and a collision occurred, or (b) the data in the time slot was corrupted for any other reason, such as bit errors due to noise. In either of these events, the information in the time slot is corrupted. In this circumstance, the process of FIG. 9 proceeds, in step 904, to go to the process illustrated in FIG. 10.

FIG. 10 illustrates the process that occurs when the value of A(i,j) indicates that (a) 10 a time slot is IDLE or has a BUSY/FINAL status, which would follow processing in FIG. 8, or (b) there was a COLLISION, and the station is allowed to transmit in accordance with step 904 in FIG. 9. In either of these events, the upcoming time slot (i+1j) is available for contention by all stations, and the station performing the process is allowed to transmit in that time slot. Accordingly, the value of $L_a(j)$ is set high, in step 1001. Next, in step 1002, the station performing the process determines whether it needs the $j^{th}$ time slot in the next frame (frame i+2). Note here that it had already been determined, by virtue of the positive result reached in step 802, that the station had information to transmit in the upcoming frame (frame i+1). If a positive result occurs in step 1002, the value of the $C_f$ bit is set to I in step 1004, to indicate that the transmission in the $j^{th}$ time 20 slot in the upcoming frame will continue in the same time slot in the next succeeding frame. The station also writes information destined for head end 109 into time slot (i+1j) in step 1004. If a negative result occurs in step 1002, the value of the $C_s$ bit is set to 0 in step 1003, to indicate that the transmission in the $j^{th}$ time slot in the upcoming frame will not continue in the same time slot in the next succeeding frame. The station also writes information destined for head end 109 into time slot (i+1,j) in step 1003. In either case, the value of $C_s$ is set to zero in steps 1003 and 1004, to indicate that slot continuation (i.e., superslot) is not in use. Also, in either case, following steps 1003 and 1004, the process of FIG. 10 continues by returning to step 814 of FIG. 8 in step 1006.

FIG. 11 is a diagram illustrating the process when the downstream acknowledgment indicates that a time slot has a BUSY/CONTINUATION status, or when a collision has occurred involving a station that had reserved a time slot. First, in step 1102, a determination is made from the destination address, DA(i,j), whether or not the acknowledgment message indicates that this particular station has already reserved the $j^{th}$ time slot, If not, processing for this slot ends, and the process returns, via step 1104, to 35 step 814 in FIG. 8. If a positive result is obtained in step 1102, the process continues with step 1106, which determines whether or not $L_a(j)$ high, indicating that a transmission attempt was made by the station in time slot (i,j), in order to initially acquire control of that time slot. If the result of step 1106 is positive, the station has acquired a new time slot, and therefore increases the value of $N_2$, which is a variable representing the number of time slots in a frame that have been obtained or acquired by that station. If the result of step 1106 is negative, the station was not attempting to initially acquire the time slot, but rather was using an already acquired time slot in the continuation mode. In this event, a determination is next made in step 1110 as to whether the station requires the use of the $j^{th}$ time slot in the next frame. This would be true, when, for example, a constant bit rate call is in progress. Following the determination in step 1110, the process continues with steps 1112 and 1114, which are, with one exception, the same as steps 1003 and 1004, previously described in connection with FIG. 10. The exception occurs in step 1114, which provides for a decrease in the value of $N_0$ to $N_0-1$ when a negative result is reached in step 1110. This decrease would, for example, occur when the bit rate for a call in progress decreases, and the call can still be supported with fewer time slots.

From the foregoing description, it will be seen that the variable $N_0$ is increased (in step 1108) when a station is seeking to acquire new time slots for its traffic, and decreased (in step 1114) when the station does not need some of its acquired time slots to carry the traffic that it currently has. This process thereby regulates the number of time slots being used by a station to meet its current needs, and helps to improve the efficiency achieved by the present invention.

As stated previously, transmitting stations that have obtained the use of multiple contiguous time slots may make more efficient use of the cable bandwidth by transmitting data during what is usually guard time between time slot boundaries. This guard time normally insures the ability of different stations to transmit in successive time slots and be sure of not interfering with one another. However, we have found that if the same station is using successive time slots, that inter-slot guard time can be used for data.

FIG. 12A is a diagram similar to FIG. 11 illustrating the process when the downstream acknowledgment indicates that a time slot has a BUSY/CONTINUATION status, but in an embodiment of the invention where superslots may be used to insert data into what would otherwise be guard time. Accordingly, if use of superslots is allowed, then step 812 in FIG. 8 would read "GO TO FIG. 12A". The part of the process shown in FIG. 12k namely the process of steps 1202, 1204, 1206 and 1208 are the same as steps 1102, 1104, 1106 and 1108 in FIG. 11. However, in FIG. 12k if the result of step 1206 is positive, then after the value of $L_a(j)$ is set to zero and the value of $N_0$ is increased in step 1208, the process proceeds, in step 1205, to go to FIG. 12B, discussed in more detail below, in order to determine the possibility of using superslots, and, if superslots can be used, to set the parameters associated with such use.

If the result in step 1206 is negative, or when the process of FIG. 12B is completed, the process of FIG. 12A continues with step 1210, which is the same as step 1110 of FIG. 11. If a negative result is reached in step 1210, the process proceeds with step 1214, which is the same as step 1114 in FIG. 11, and the process then returns, in step 1204, to step 814 of FIG. 8. The sequence of steps just described may occur, for example, when the use of superslots is possible, and a station has made a determination that the use of the $j^{th}$ time slot can be discontinued in the next frame. This might occur when the use of a superslot results in more efficient use of bandwidth, and therefore the station has access to the same amount of bandwidth even after releasing the time slot in consideration.

If the station, in step 1210, determines that the time slot (i+1,j) is needed in the next frame, frame (i+1), a determination is next made in step 1216 as to whether or not time slot j in the next frame is part of a superslot. This is determined by the result of the 15 processing that occurred in step 1205. If the result of step 1216 is negative, then time slot j is not part of a superslot. In this event, the value of $C_f$ is set to 1 and the value of $C_s$ is set to 0, and the data is written in the time slot, all in step 1220. The process then returns, in step 1204, to step 814 of FIG. 8.

If the result of step 1216 is positive, then a determination is made, in step 1224, as 20 to whether or not the time slot is the first time slot of the superslot. This is done so that, if a positive result occurs, the guard time, preamble, SDD, and SA can all be written into the time slot in step 1226. Also, the values of both $C_f$ and $C_s$ are set to 1, and the value of $L_s$ is written into the portion 713 of the superslot, as shown in FIG. 7. On the other hand, if a negative result occurs in step 1224, then the overhead data written in step 1226 is bypassed. In either event, in step 1228, the payload data is written into the time slot.

The intent of the process illustrated in step 1224, 1226 and 1228 is to eliminate the use of guard time, preamble, and other components of the time slot overhead that would normally be found at time slot boundaries. This information is now only included in the first time slot of each superslot.

FIG. 12B illustrates the process used to determine the possible use of superslots in accordance with the present invention. The process begins in step 1251, and, as stated previously, is invoked following step 1208 in FIG. 12A. In step 1252, a determination is made of the number $N_c$ of contiguous time slots and the number $N_d$ of non-contiguous time slots, that are "currently available" to the station in which the process is being performed. For this purpose, each station examines its previously obtained time slots, meaning those time slots which have been acquired by the station, and determines which of these slots are contiguous and which are not contiguous. Note that the sum of $N_c$ and $N_d$ represents the number of obtained time slots, $N_0$, mentioned above. Next, in step 1253, the value of Nc is evaluated, to determine if there are at least two continuous time slots available. If a negative result occurs in step 1253, this indicates that contiguous time 5 slots are not available, and that superslots cannot be used. Accordingly, the process returns, in step 1254, to step 1205 in FIG. 12k.

If a positive result occurs in step 1253, this indicates that at least 2 contiguous time slots are available. Then, in step 1255, a determination is made as to whether there are enough time slots available to form a superslot which can accommodate an integral number of payloads, (i.e., packets or ATM cells) as shown in FIG. 7. If the result of step 1255 is positive, then, in step 1256, the superslot is formed by combining the contiguous time slots, as shown in FIG. 7. During the formation of the superslot, any time slot(s) that are no longer needed are released. 11 in step 1255, it is determined that there are not enough time slots available to form a superslot which can accommodate an integral number of payloads, then the $N_c$ contiguous time slots that are available are used in a superslot mode, in step 1257. This means that the payloads will be arranged so that they I follow successively until the end of a superslot, with the possibility that the last payload may only be partially accommodated. Accordingly, the remainder of the payload will be placed at the beginning of the next superslot.

FIG. 13 illustrates the processing done in the head end 109 in accordance with the present invention. This processing is done in the MAC processor 384 of FIG. 3B which is a part of the head end 109. The process of FIG. 13 works in conjunction with the corresponding process (FIGS. 8, 9, 10, and 11) in the stations to implement the overall MAC protocol in accordance with the present invention.

The process of FIG. 13 begins with step 1302, in which the values of i and j are each initialized. This initialization occurs once, when the head end becomes synchronized to process time slots on the transmission medium. Thereafter, the process of FIG. 13 is performed for each time slot in succession. First, in step 1304, a determination is made as to whether time slot (i,j) is "used" or "IDLE". This determination can be made in RF unit 372, based on the signal energy in the time slot being above some threshold value. The result of this determination is transmitted from RF unit 372 to the MAC processor 384. If the threshold is exceeded, the time slot is considered used and otherwise, the time slot is considered IDLE.

If a time slot is not used, the acknowledgment message for that time slot, A(i,j) is set as IDLE in step 1308, and the value of the destination address (DA) is set to zero (or some other predetermined unique value that does not correspond to a valid address of any station) to indicate to the stations that the time slot is IDLE. The values of i and j are then incremented or updated, in the manner described above, in step 1340, and the process repeats for the next time slot.

If a time slot is not IDLE, a positive result is obtained in step 1304. In that event, 5 a determination is made in step 1310 as to whether a preamble has been identified in the time slot, and a further determination is made in step 1320, as to whether a slot data delimiter (SDD) has been identified in the time slot, If either (or both) of the results in steps 1310 and 1320 are negative, then the process proceeds to step 1328, which sets the acknowledgment message for that time slot, A(i,j), to COLLISION, and which further sets the value of the destination address (DA) to zero. This is because, when a collision occurs, either or both the SDD and/or the preamble are corrupted. This condition can also happen if noise corrupted the time slot. Note that, as an alternative arrangement to that illustrated in steps 1310 and 1320, a collision can be detected, as stated previously, using BY unit 372 in the head end 109.

Next, a determination is made in step 1314 as to whether this time slot had been reserved in the previous frame, i.e., frame i−1. If not, then the process proceeds to step 1340, as discussed above. If the time slot had been reserved, then, in accordance with the present invention, the same slot is again reserved, despite the collision. Accordingly, in step 1312, the value of the destination address, DA(i,j) is returned to its corresponding value in the previous frame, namely DA(i−1,j), and the process then proceeds to step 1340 as discussed above. In order to accomplish a return to the previous value in step 1312, head end 109 should be provided with a suitable memory capability, typically included in buffers 379 of FIG. 38.

If the results of both steps 1310 and 1320 are positive, this indicates that the time 25 slot contains data that was inserted into that time slot by one of the stations 107, and that data is read in step 1322. The process proceeds to step 1324, in which a determination is made as to whether the frame continuation bit, $C_f$, is high (i.e., equal to 1). (It should be noted that it is presumed that a CRC check or Forward Error Correction (FEC) is not a part of the MAC layer function and is, e.g., a part of the layer 3 function (not described). However, the flow chart of FIG. 13 could be readily modified to include such a check or correction, e.g., subsequent to step 1322.) If so, this indicates that the same time slot is reserved in the next frame by the station that is currently using that time slot. Accordingly, in step 1316, the acknowledgment message for that time slot, A(i,j), is set to BUSY/FINAL, and the destination address, DA(i,j) is set to the valid address of the station which transmitted in time slot (i,j), namely SAQ). If the result of the determination made in step 1324 is negative, this indicates that the same time slot is not reserved in the next frame by the station that is currently using that time slot. Accordingly, in step 1318, the acknowledgment message for that time slot, A(i,j), is set to BUSY/CONTINUATION. Here again, the destination address, DA(i,j) is set to the valid address of the station which transmitted in time slot (i, j) namely SA(j).

Following steps 1316 or 1318, the process of FIG. 13 continues, in step 1306, to determine if the value of the time slot continuation bit, $C_s$, is high, thus indicating that the station is using a superslot. If the result of step 1306 is negative, the values of i and j are updated in step 1342, and the process of FIG. 13 is repeated for the next time slot. If superslots are being used, and the result of step 1306 is thus positive, the value of $L_s$, representing the number of time slots that have been combined to form the superslot, is read from field 713 (FIG. 7) in the upstream message, in step 1309. Then the value of $L_s$, is decremented in step 1322, (to account for the fact that the first time slot in the superslot had already been read in step 1322) and a determination is made, in step 1334, as to whether $L_s$, is zero. Normally, a negative result will occur, indicating that there are more time slots in the superslot to be read. In this event, the process proceeds to step 1336, in which the data is read, the value of (i,j) is incremented, the acknowledgment message for that time slot, A(i,j), is set to A(i,j−1), and the destination address, DA(i,j) is set to DA(i,j−1), since this time slot is being used by the same station that used the previous time slot, i.e., time slot (j−1).

Following step 1336, steps 1322, 1334 and 1336 are repeated, in turn, for each of the remaining time slots in the superslot, until the determination in step 1334 is positive, indicating, as stated previously, that all time slots in the superslot have been processed. In the latter event, the process returns to step 1342.

Based upon the foregoing description of the present invention, it will be observed 25 that this invention is particularly useful in conjunction with packet transmission systems, such as asynchronous transfer mode (ATM) systems, because the time slot size can be selected such that each time slot can accommodate one ATM cell. By virtue of this arrangement, it is possible to achieve ATM compatibility throughout the network, i.e., from the stations 107 to the service platforms 390.

It will also be noted that while the cable television environment is susceptible to significant noise in the spectrum being allocated for upstream use, the present invention reacts well and is thus robust with respect to noise. This is illustrated by several examples: First, if noise causes loss of the initial message in an upstream time slot, there will be an indication of corruption in that slot by the head-end status feedback. When the station that originated this message sees the corruption indication, it retransmits the message, no matter what kind of call it is. Second, if noise causes corruption of an ongoing message while the frame continuation bit $C_f$ set to "one", it is desirable that the head-end should formulate an acknowledgment message that indicates that the time slot is still available to the same station. This is accomplished by head-end 109 storing the destination addresses from the previous frame, as described previously in conjunction with steps 1312 and 1314 in FIG. 13. Third, if noise causes corruption of an ongoing upstream message with the continuation bit $C_f$ set to "zero", meaning that this was intended to be the final message from that station, head end 109 will in steps 1312 and 1314 of FIG. 13 treat the time slot as if it were busy, with the continuation bit $C_f$ set to "one". In this case, head end 109 will incorrectly indicate in the current acknowledgment message that the time slot status was BUSY/CONTINUATION. However, in the next frame, head end 109 will correctly determine the status of the time slot, and will indicate in the next acknowledgment message that the time slot status was either IDLE (in the case of a CBR. call disconnecting) or BUSY/FINAL (in the case of a station retransmitting its last message). Finally, if noise corrupts a downstream acknowledgment message, this condition will have different impacts on stations depending on the type of service they were using. A station that has been transmitting this time slot and setting the continuation bit $C_f$ to one will still j have access to that time slot. Other stations that cannot decipher the downstream acknowledgment message will not transmit in that time slot. For CBR. stations, such as those transmitting voice information, no retransmission will occur, because recovery of lost packets in not important in voice applications. A station that has been sending data will assume that the last packet got through successfully. If in fact it didn't, higher layer protocols will request retransmission. A station that was contending for a time slot initially, will retransmit.

One unlikely but still possible condition in the decentralized version of the present invention, is that a number of stations want to make CBR calls that require multiple time slots and that they will all gain access to a few time slots, but none of the stations will gain access to all of the time slots that they need. If something is not done, the stations might continue to hold their time slots, and deadlock would occur, because no station could get enough bandwidth to establish its CBR call. The basic solution here is to implement a timer and a time-out process in each of the stations. Each station monitors the time period during which it has acquired some but not all of the time slots that it needs. When the timer exceeds a predetermined time period, each station is arranged to release any time slots that it has acquired, and drop the call. The station will subsequently attempt to gain access to the required bandwidth by initiating a new call.

A major concern for an access protocol in the coaxial cable, fiber and wireless environments is the efficiency of utilization of the limited upstream bandwidth. Efficiency is affected by the type of traffic. Analysis performed with respect to the present invention indicates that its efficiency is about the same level as conventional TDMA for CBR calls. For VBR calls, the efficiency of the present invention varies as a function of the length of time over which the frame and/or slot continuation bits are used. In the worst case of only one message sent with each access, such that the $C_f$ bit is never set to "one", the present invention has the same efficiency as slotted ALOHA.

Overall, the efficiency of the present invention is better than TDMA, because for sporadic bandwidth needs, it is not necessary to allocate a fixed amount of bandwidth to one station, most of which goes unused. By way of comparison, in TDMA, the peak level that is needed once in a while must none the less be allocated at all times. Also, for sporadic traffic, such as button pushes in ITV applications, the present invention maintains low delay characteristics, while still maintaining better bandwidth efficiency. Since the present invention can provide CBR service and has the capability of superslots, it is also overall more efficient than slotted ALOHA or TDMA.

As stated previously, while the present invention has been primarily described in the context of a fiber/coax based transmission infrastructure, it is to be understood that the invention is also applicable to a wireless communications environment. In the latter environment, the functions performed by stations 107 would be performed in each "mobile station". The function performed in head end 109 would be performed in the "base station", and the interconnection between stations 107 and head end 109, heretofore referred to as the "fiber/coax medium" would be the "wireless medium" over which two way communications between mobile stations and the base station are effected.

Various modifications can be made to the present invention, and will be apparent to those skilled in the art. Several examples will illustrate:

First, the decision to create and allocate superslots can be performed in a centralized manner, at the common controller or head end, rather than in a decentralized manner at the individual stations. In this arrangement, the head end determines that contiguous time slots are available and that a particular station may have access to those time slots. The head end then signals that particular station, in an acknowledgment message addressed to that station, to use the contiguous time slots as a superslot. The station receiving the acknowledgment message then combines the individual time slots and transmits across multiple time slot boundaries, as allowed by the head end. As in the decentralized arrangement, this type of arrangement also increases bandwidth efficiency by eliminating the guard times between time slots within a superslot.

Second, even if superslots are not being used, the process of allocating multiple time slots to a particular station can be performed in a centralized manner, at the head end, rather than in a decentralized manner at the individual stations. Specifically, instead of using superslots, the head end may be arranged to assign multiple non-contiguous time slots to a particular station, based upon its request. This type of arrangement would be useful where either the system precludes the use of superslots, or where superslots are in 5 use but the head end could not locate contiguous time slots.

Third, the present invention can easily be arranged to properly accommodate "button push" type of traffic associated with Video on Demand (VOD) and video gaming services. This traffic is low bit rate, but relatively high priority when it occurs. By assigning one (or more) time slots by, for example, a modification of downstream status/acknowledgment messages, to always be available for this type of traffic, low delay and high throughput can be ensured. Stations handling CB1 (traffic that might otherwise seek to reserve this slot by using the continuation field in the header would be precluded from doing so. An analysis of traffic requirements would be required to determine how many time slots should be allocated to this traffic.

What is claimed is:

1. A method of allocating transmission bandwidth among a plurality of stations interconnected with a common controller via a transmission medium having a multiple access upstream channel, said method comprising the steps of:

dividing data in said upstream channel on said transmission medium into a series of successive time frames;

dividing each of the time frames into a plurality of time slots wherein said time slots consist of both fixed length and variable length time slots;

responsive to contention by competing stations of said plurality of stations requiring transmission bandwidth, allocating, on an initial basis, one or more of said plurality of time slots to a particular station of said plurality of stations that contends for said plurality of time slots;

reserving said one or more of said plurality of time slots for continued use by said particular station in response to a reservation indication contained in a plurality of messages inserted by said particular station in said one or more of said plurality of time slots;

providing a plurality of status messages in said one or more of said plurality of time slots indicative of a status of each of said one or more of said plurality of time slots to said plurality of stations from said common controller, the plurality of status messages provided in said plurality of time slots including overhead information; and combining contiguous time slots of the plurality of time slots to form a super slot, if said contiguous time slots are allocated to a particular station of said plurality of stations, by eliminating the overhead information contained in at least one of said contiguous time slots.

2. The method defined in claim 1, wherein a first subset of said plurality of stations each originate constant bit rate (CBR) traffic requiring a first number of time slots per time frame, a second subset of said plurality of stations each originate CBR traffic requiring a second number of time slots per time frame, and wherein said first and second numbers are different.

3. The method defined in claim 1, wherein a first subset of said plurality of stations each originate constant bit rate (CBR) traffic requiring a fixed number of time slots per time frame and a second subset of said plurality of stations each originate variable bit rate (VBR) traffic requiring a variable number of time slots per time frame.

4. The method defined in claim 1, wherein said method further includes the steps of:

providing said plurality of status messages in a downstream channel; and responsive to said plurality of status messages, said plurality of stations (a) transmitting a new packet in one of said plurality of time slots, (b) continuing to transmit an on-going message in one of said plurality of time slots, or (c) allowing other ones of said plurality of stations to transmit in one of said plurality of time slots.

5. A method of allocating transmission bandwidth among a plurality of stations interconnected with a common controller via a transmission medium having a multiple access upstream channel, at least one of said plurality of stations originating variable bit rate (VBR) traffic, said method comprising:

dividing data in said upstream channel on said transmission medium into a series of successive time frames;

dividing each of the time frames into a plurality of time slots;

allocating a guaranteed minimum number of time slots of said plurality of time slots to at least one station of said plurality of stations, on an initial basis, when said at least one station contends for said plurality of time slots;

allocating said guaranteed minimum number of time slots for continued use by said at least one station in response to a first reservation indication contained in a first plurality of messages inserted by said at least one station in said guaranteed minimum number of time slots, wherein the first plurality of messages inserted into said guaranteed minimum number of time slots include first overhead information;

allocating a plurality of additional time slots of said plurality of time slots to said at least one station when the at least one station signals a high activity period, allocating said plurality of additional time slots for continued use by said at least one station during said high activity period, in response to a second reservation indication contained in a second plurality of messages inserted by said at least one station in said plurality of additional time slots; wherein the second plurality of messages inserted into said plurality of additional time slots include second overhead information;

releasing said plurality of additional time slots when the at least one station signals a decrease in its activity; and wherein, if more than one of said guaranteed minimum number of time slots and said plurality of additional time slots is allocated to a particular station, said method further includes the steps of:

determining if said more than one of said guaranteed minimum number of time slots and said plurality of additional time slots are contiguous; and combining said guaranteed minimum number of time slots and said plurality of additional time slots into a superslot if said more than one of said guaranteed minimum number of time slots and said plurality of additional time slots are contiguous, by eliminating the overhead information contained in at least one of said more than one of said guaranteed minimum number of time slots and said plurality of additional time slots.

6. A method of allocating transmission bandwidth among a plurality of stations interconnected with a common controller via a transmission medium having a multiple access upstream channel, said method comprising the steps of:

dividing time in said upstream channel on said transmission medium into a series of successive time frames;

dividing each of the time frames into a plurality of time slots wherein said time slots consist of both fixed length and variable length time slots;

providing a plurality of status messages indicative of a status of each of said plurality of time slots to said plurality of stations from said common controller, said plurality of status messages being provided in a downstream channel;

responsive to said plurality of status messages, said plurality of stations(a) transmitting a new packet in one of said plurality of time slots, (b) continuing to transmit an on-going message in one of said plurality of time slots, or (c) allowing other ones of said plurality of stations to transmit in one of said time slots; and wherein each of said plurality of status messages is provided to said plurality of stations in a time slot of said plurality of time slots in said downstream channel that occurs at a time interval before an appearance of a corresponding time slot of the plurality of time slots in a next succeeding time frame in the series of successive time frames in said upstream channel.

7. The method defined in claim 6, wherein said time interval is sufficiently long so as to permit said plurality of stations to process and respond to said plurality of status messages.

8. A method for allowing a plurality of stations originating constant bit rate (CBR) and variable bit rate (VBR) types of traffic to share a transmission medium having a multiple access upstream channel to a common controller, said upstream channel including a series of successive time frames, and each time frame including a plurality of time slots, said method comprising the steps of:

determining the type of traffic to be transmitted by a station seeking access to the transmission medium, for CBR traffic, allocating, on an initial basis, one or more of said plurality of time slots to a first station of said plurality of stations that contends for said plurality of time slots; and reserving said one or more of said plurality of time slots for continued use by said first station in response to a first reservation indication contained in a first plurality of messages inserted by said first station in said one or more of said plurality of time slots; and for VBR traffic, allocating a guaranteed minimum number of time slots of said plurality of time slots to a second station of said plurality of stations, on an initial basis, when said second station contends for said plurality of time slots;

reserving said guaranteed minimum number of time slots for continued use by said second station in response to a second reservation indication contained in a second plurality of messages inserted by said second station in said guaranteed minimum number of time slots; allocating a plurality additional time slots of said plurality of time slots to said second station when the second station signals a high activity period;

reserving said plurality of additional time slots for continued use by said second station during said high activity period, in response to a third reservation indication contained in a third plurality of messages inserted by said second station in said plurality of additional time slots;

releasing said plurality of additional time slots when the second station signals a decrease in its activity, and wherein, if more than one of said guaranteed minimum number of time slots and said plurality of additional time slots is allocated to a particular station, said method further includes the steps of:

determining if said more than one of said guaranteed minimum number of time slots and said plurality of additional time slots are contiguous; and combining said guaranteed minimum number of time slots and said plurality of additional time slots into a superslot, if said more than one of said guaranteed minimum number of time slots and said plurality of additional time slots are contiguous, by eliminating overhead information contained in at least one of said more than one of said guaranteed minimum number of time slots and said plurality of additional time slots.

9. The method defined in claim 8, wherein said transmission medium further includes a downstream channel, and wherein said method further includes the steps of:

providing a plurality of status messages indicative of a status of each of said plurality of time slots to said plurality of stations, said plurality of status messages being provided in said downstream channel; and responsive to said plurality of status messages, said plurality of stations (a) transmit a new packet in one of said plurality of time slots, (b) continue to transmit an ongoing message in one of said plurality of time slots, or (c) allow other ones of said plurality of stations to transmit in said one of said plurality of time slots.

10. A communication system, including:

a transmission network, wherein a plurality of stations are interconnected with a common controller via a transmission medium having a multiple access upstream channel and a broadcast downstream channel, each of said upstream and downstream channels defining a sequence of time frames, each of the time frames including a plurality of time slots, and means for allowing any of said plurality of stations requiring isochronous, asynchronous or sporadic transmission capacity to transmit signals in any available time slots of the plurality of time slots on said upstream channel without interfering with each other, wherein the means for allowing includes:

means in said common controller for transmitting status information regarding the plurality of time slots in said upstream channel to said plurality of stations, said status information being transmitted in said downstream channel;

means in said plurality of stations for receiving said status information and in response, interpreting and creating a control signal indicating whether to transmit or not;

means in said plurality of stations arranged so that, if said plurality of stations transmit data in one or more of said plurality of time slots in said upstream channel, said plurality of stations include an indication of sustained use of said one or more of said plurality of timeslots in subsequent time frames in the sequence of time frames; and means in the plurality of stations for inserting in a particular subset of the plurality of time slots, a first indication to said common controller of an intention of a particular station to combine a plurality of messages in a contiguous series of time slots of the plurality of time slots in a time frame in the sequence of time frames.

11. A communication system, including:

a transmission network, wherein a plurality of stations are interconnected with a common controller via a transmission medium having a multiple access upstream channel and a broadcast downstream channel, each of said upstream and downstream channels defining a sequence of time frames, each of the time frames including a plurality of time slots, means in the plurality of stations for inserting in a particular subset of the plurality of time slots, a first indication to said common controller of an intention of a particular station to combine a plurality of messages in a contiguous series of time slots of the plurality of time slots in a time frame in the sequence of time frames, and a second indication to said common controller of an intention of said particular station to use a particular time slot in a particular subsequence of time frames in the sequence of time frames.

12. The system of claim 11, wherein said plurality of messages includes overhead information, and wherein said combining means includes means for forming a superslot by eliminating said overhead information contained in said plurality of messages in said contiguous time slots of theplurality of time slots.

13. The system defined in claim 12, wherein said overhead information includes a guard time and a preamble, and wherein said combining means is arranged to eliminate the guard time and preamble normally found between at least two adjacent time slots of the plurality of time slots.

14. A method of providing shared access to a plurality of time slots on a transmission medium interconnecting a plurality of stations to a common controller via a tree and branch arrangement, comprising the steps of:

generating in said plurality of stations an indication for said common controller of a type of traffic being generated in said plurality of stations, said type of traffic including isochronous, asynchronous or sporadic traffic;

responsive to said indication of the type of traffic, generating in a head end a signal for providing each station of the plurality of stations with necessary bandwidth by (a) dynamically allocating a number of time slots of the plurality of time slots assigned to said each station in each time frame, and (b) reserving those time slots of the plurality of time slots in a plurality of successive time frames assigned to contain information associated with said each station; and modifying an allocated number of time slots of the plurality of time slots for a particular station of the plurality of stations in accordance with a look ahead prediction of a need for additional bandwidth by that particular station.

15. The method defined in claim 14, wherein said common controller is further arranged to generate a plurality of status messages for upstream time slots of the plurality of time slots and transmit said status plurality of messages in a downstream channel, said plurality of status messages reflecting the allocations of said plurality of time slots.

16. The method defined in claim 15, wherein each station seeking access for sporadic traffic is arranged to transmit in a time slot of the plurality of time slots that is not yet allocated and is thus available for contention.

17. The method defined in claim 15, wherein each station transmitting asynchronous traffic is further arranged to obtain additional bandwidth needed to transmit additional information by transmitting in other available time slots of the plurality of time slots on a contention basis.

18. The method defined in claim 16, further including the step of preassigning, in said common controller, one or more time slots of the plurality of time slots for use solely by a portion of the sporadic traffic generated in said each station, based upon a priority of said portion of the sporadic traffic.

19. An apparatus for allocating transmission bandwidth among a plurality of stations interconnected with a common controller via a transmission medium having a multiple access upstream channel, said apparatus comprising:

means for (a) dividing data in said upstream channel on said transmission medium into a series of successive time frames and (b) dividing each of the time frames into a plurality of time slots;

means for providing a plurality of status messages indicative of a status of each of said plurality of time slots to said plurality of stations from said common controller, said plurality of status messages being provided in a downstream channel;

means in said plurality of stations, responsive to said plurality of status messages, for (a) transmitting a new packet in one of said time slots, (b) continuing to transmit an on-going message in one of said time slots, or (c) allowing other ones of said stations to transmit in said one of said time slots; and means for combining contiguous time slots of the plurality of time slots, if said contiguous time slots are allocated to a particular station of said plurality of stations, by eliminating overhead information contained in at least one of said contiguous time slots.

20. A method of allocating transmission bandwidth among a plurality of stations, said method comprising:

combining contiguous time slots of a plurality of time slots, if said contiguous time slots are allocated to a particular station of said plurality of stations, by eliminating overhead information contained in at least one of said contiguous time slots.

21. The method of claim 20, wherein the plurality of stations are interconnected with a common controller via a transmission medium having a multiple access upstream channel.

22. A method for allowing a plurality of stations originating constant bit rate (CBR) and variable bit rate (VBR) types of traffic to share a transmission medium having a multiple access upstream channel to a common controller, said upstream channel including a series of successive time frames, and each time frame including a plurality of time slots, said method comprising the steps of:

combining one or more guaranteed time slots of the plurality of time slots and one or more additional time slots of the plurality of time slots into a superslot, if said one or more guaranteed time slots and said one or more additional time slots are contiguous and allocated to the same station of the plurality of stations, by eliminating overhead information contained in at least one of said plurality of guaranteed time slots and said plurality of additional time slots.

* * * * *